(12) United States Patent
Nakano et al.

(10) Patent No.: US 7,245,564 B2
(45) Date of Patent: Jul. 17, 2007

(54) METHOD OF IDENTIFYING OPTICAL DISC TYPE, AND OPTICAL DISC DEVICE

(75) Inventors: Jun Nakano, Yamato (JP); Hideo Fukuda, Yamato (JP)

(73) Assignee: Victor Company of Japan, Limited, Yokohama (JP)

( * ) Notice: Subject to any disclaimer, the term of this patent is extended or adjusted under 35 U.S.C. 154(b) by 551 days.

(21) Appl. No.: 10/803,909

(22) Filed: Mar. 19, 2004

(65) Prior Publication Data

US 2004/0196769 A1    Oct. 7, 2004

(30) Foreign Application Priority Data

Mar. 20, 2003   (JP)   ............ P2003-078859

(51) Int. Cl.
G11B 7/085    (2006.01)
(52) U.S. Cl. .............. 369/44.27; 369/44.29; 369/44.41; 369/53.28
(58) Field of Classification Search ............ 369/53.28, 369/44.27, 44.29; 327/34, 551, 552; 326/26, 326/27; G11B 7/08, 7/085, 7/00; G06F 17/10; H03K 9/08, 19/094
See application file for complete search history.

(56) References Cited

U.S. PATENT DOCUMENTS

| | | | |
|---|---|---|---|
| 6,058,082 A | 5/2000 | Hwang | |
| 6,278,672 B1 * | 8/2001 | Kobayashi | ............ 369/53.23 |
| 6,449,232 B1 | 9/2002 | Kuwahara et al. | |

FOREIGN PATENT DOCUMENTS

| | | |
|---|---|---|
| JP | 09-044982 | 2/1997 |
| JP | 09-190634 | 7/1997 |
| JP | 09-204728 | 8/1997 |
| JP | 09-274765 | 10/1997 |
| JP | 09-293321 | 11/1997 |
| JP | 10 097755 | 4/1998 |
| JP | 2000-293932 | 10/2000 |
| JP | 2001-101771 | 4/2001 |
| JP | 2001-176129 | 6/2001 |
| JP | 2001-209936 | 8/2001 |
| JP | 2002-367171 | 12/2002 |
| JP | 2004-146016 | 5/2004 |

* cited by examiner

Primary Examiner—A M Psitos
(74) Attorney, Agent, or Firm—The Nath Law Group; Jerald L. Meyer; Teresa M. Arroyo

(57) ABSTRACT

An unknown optical disc is identified as a CD when an all sum signal value AS-max by a photodetector on a signal surface of the unknown optical disc is larger than an all sum signal value AS-cdref for CD signal surface reference for identifying the CD and the hybrid SACD as a CD based on each CD signal surface thereof, and a focus search driving voltage Y corresponding to the signal surface of the unknown optical disc is lager than a voltage value acquired by a predetermined relational expression between a focus search driving voltage Q corresponding to a DVD signal surface of a reference DVD and a focus search driving voltage R corresponding to a CD signal surface of a reference CD.

2 Claims, 17 Drawing Sheets

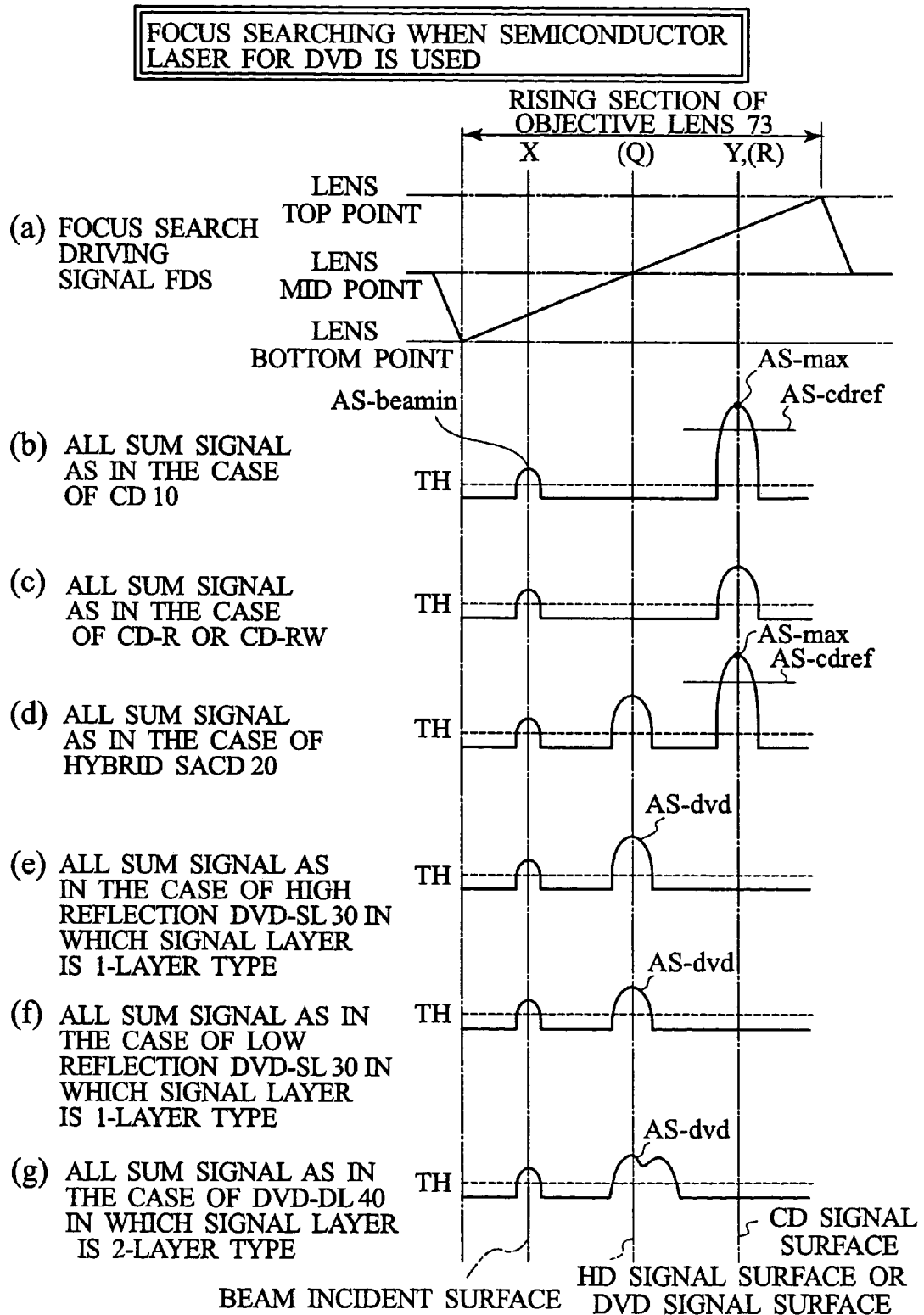

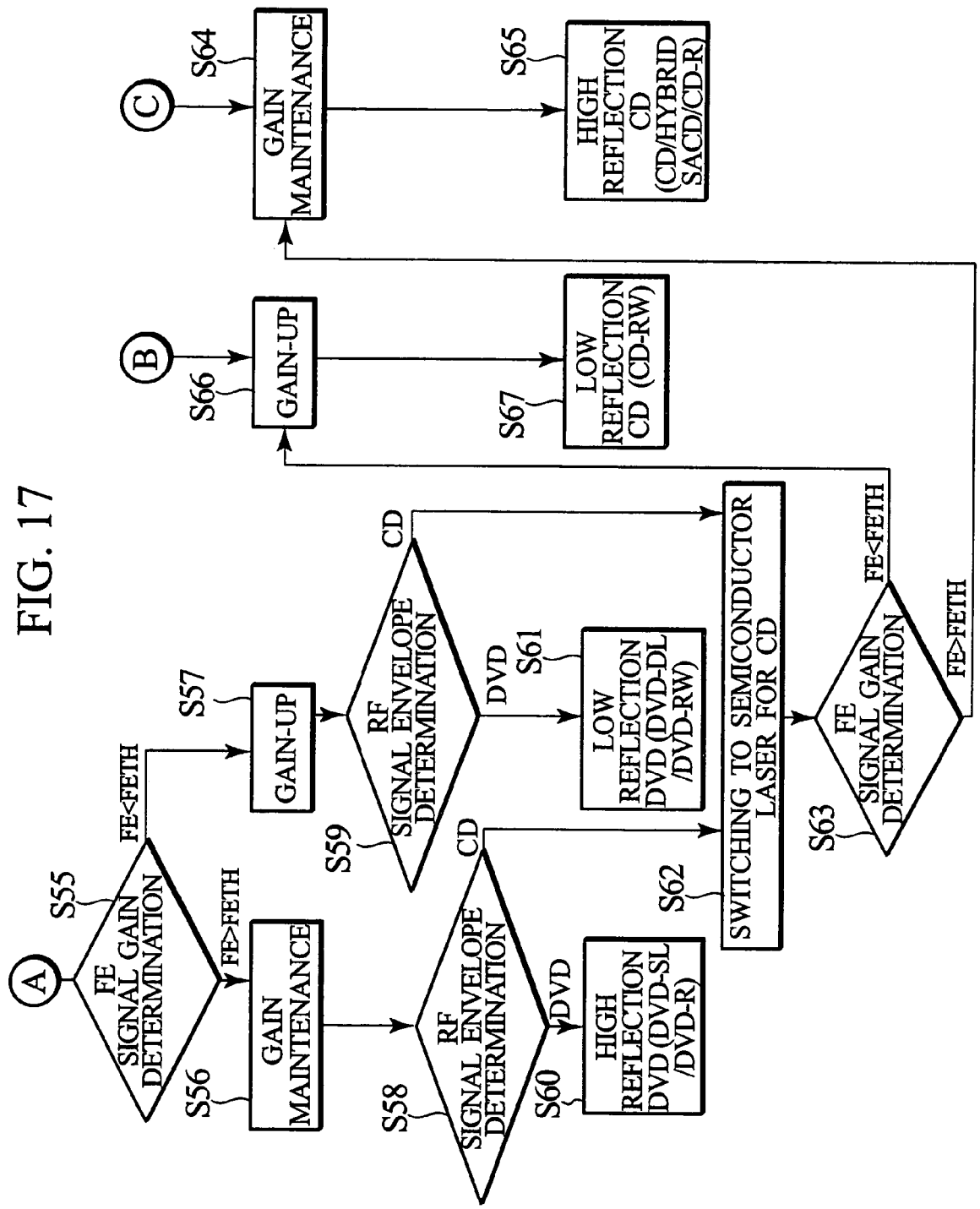

METHOD OF IDENTIFYING OPTICAL DISC TYPE, AND OPTICAL DISC DEVICE

BACKGROUND OF THE INVENTION

1. Field of the Invention

The present invention relates to an optical disc device on which a CD (Compact Disc), a hybrid SACD (Super Audio CD) and a DVD (Digital Versatile Disc) can be selectively loaded. More particularly, the invention relates to a method of identifying an optical disc type, which can identify a hybrid SACD that has an HD signal surface employing a 1-bit direct stream digital technology and a known CD signal surface to be a CD among a plurality of types of CDs, and an optical disc device.

2. Description of the Related Art

Generally, an optical disc has been in wide use as it enables recording information signals such as video information, audio information or computer data on a track helically or concentrically formed on a disc substrate at a high density and high-speed access to a desired track when an information signal is recorded or reproduced from a recorded track.

Now, optical discs can be largely classified into a read-only type and a recordable type. In the case of the optical disc of the read-only type, a concave-convex pit row of tracks is helically or concentrically formed on a disc substrate by injection molding that uses a resin material, and a reflection film of aluminum or the like is attached on the concave-convex pit row to form a signal surface.

On the other hand, in the case of the optical disc of the recordable type, a track is previously formed of concave-convex grooves and lands helically or concentrically formed beforehand on a disc substrate by injection molding that uses a resin material, and a recording film and a reflection film are sequentially attached on the grooves and the lands to form a signal surface.

Then, the optical disc of the read-only type reproduces data in the following manner. The signal surface is irradiated with a laser beam for reproduction which is emitted through an objective lens from an optical pickup disposed in an optical disc device to be movable in a diameter direction of the optical disc, and a return light beam reflected from the signal surface is received by a photodetector.

On the other hand, the optical disc of the recordable type records an information signal on the recording film of the signal surface by a laser beam for recording which is emitted through an objective lens from an optical pickup disposed in an optical disc device to be movable in a diameter direction of the optical disc, and then reproduces the signal from the recorded signal surface by a laser beam for reproduction as in the above case.

Regarding compact discs (CDs) among the optical discs, there are a read-only disc on which music information has been recorded, a read-only CD-read only memory (CD-ROM) on which computer data has been recorded, a recordable/reproducible CD-recordable (CD-R) on which an information signal can be recorded only once, a recordable/reproducible CD-rewritable (CD-RW) on which the information signal can be recorded by a plurality of times, and the like. These optical discs are treated as CDs since CD signal surfaces are formed in positions apart by about 1.2 mm from beam incident surface of a disc substrate.

Further, there is a super audio CD (SACD) that employs a recently developed 1-bit direct stream digital technology. In the case of this SACD, an HD signal surface is formed in a position apart by about 0.6 mm from a beam incident surface of a disc substrate, and the HD signal surface cannot be played back by a general CD player. However, in the case of a hybrid SACD that has a CD signal surface formed in a position apart by about 1.2 mm from abeam incident surface of a disc substrate in addition to an HD signal surface described above, the SACD is treated as a CD based on the CD signal surface. This enables playing-back the CD signal surface even by the general CD player.

On the other hand, regarding digital versatile discs (DVDs) higher in recording density than CDs, there are a read-only disc for reproducing a digitized and compressed video or audio, a read-only DVD-read only memory (DVD-ROM) on which computer data has been recorded, a recordable/reproducible DVD-recordable (DVD-R) on which an information signal can be recorded only once, a recordable/reproducible DVD-rewritable (DVD-RW) and a DVD-random access memory (DVD-RAM) on which the information signal can be recorded by a plurality of times, and the like. These optical discs are treated as DVDs since DVD signal surfaces of one or two layers are formed in positions apart by about 0.6 mm from a beam incident surface of a disc substrate.

Note that, for the signal surface formed on the optical disc, while there are a read-only type and a recordable type as descried above, because a laser beam for reproduction is used when a type of an optical disc is detected, description below will be made focusing on a case of reproduction.

FIGS. 1A to 1D are schematic views explaining types of optical discs: FIG. 1A shows a CD, FIG. 1B shows a hybrid SACD, FIG. 1C shows a DVD-SL in which a signal surface is a one layer type, and FIG. 1D shows a DVD-DL in which a signal surface is a two layer type.

First, as shown in FIG. 1A, a CD (Compact Disc) 10 is constituted in a following manner. A disc substrate 11 is formed in a disc shape at a diameter of about 120 mm, a diameter of a center hole of 15 mm, and a substrate thickness of about 1.2 mm by using a transparent resin material. A CD signal surface 12 is formed in a position apart by about 1.2 mm from a beam incident surface 11a on the transparent disc substrate 11 by setting a pit width and a track pitch larger than those of a DVD, which will be described later, and attaching a total reflection film, and further a protective film 13 is attached on the CD signal surface 12.

Then, in the case of playing back the CD 10 by an optical pickup (not shown) in an optical disc device, the CD signal surface 12 is irradiated with a laser beam L1, of which a wavelength has been narrowed by an objective lens OB1 having a numerical aperture (NA) of 0.45 nearly to 780 nm from the beam incident surface 11a side of the transparent disc substrate 11, and the CD signal surface 12 is played back by a return light reflected thereon.

Next, as shown in FIG. 1B, a super audio CD (hybrid SACD) 20 is constituted as a hybrid optical disc in which the disc substrate 11 of the CD 10 is divided into two in a thickness direction, and an HD signal surface 22 is added to a middle part of a CD signal surface 25 in addition to a CD signal surface 25 of an upper surface side.

More specifically, the hybrid SACD 20 is constituted in the following manner. First and second disc substrates 21, 24 having a thickness of about 0.6 mm, respectively, are stuck together to form a disc of about 1.2 mm in total thickness by using transparent resin materials. An HD signal surface 22 that employs a one bit direct stream digital technology is formed in a position apart by about 0.6 mm from a beam incident surface 21a on the lower first disc substrate 21 by setting a pit width and a track pitch smaller than those of the CD 10 and attaching a semi-transmissive reflection film, and a protective film 23 is formed on the HD signal surface 22. A CD signal surface 25 is formed in a position apart by about 1.2 mm from the beam incident surface 21a on the upper second disc substrate 24 by setting a pit width and a track pitch larger and attaching a total reflection film as in the case of the CD 10, and further attaching a protective film 26 on the CD signal surface 25.

In the case of playing back the hybrid SACD 20, the HD signal surface 22 is irradiated with a laser beam L2, of which a wavelength has been narrowed by an objective lens OB2 having a numerical aperture (NA) of 0.5 to 0.6 to nearly 650 nm, from the beam incident surface 21a side of the lower transparent first disc substrate 21, and the HD signal surface 22 is played back by a return light reflected thereon. The CD signal surface 25 is irradiated with a laser beam L1, of which a wavelength has been narrowed by an objective lens OB1 having a numerical aperture (NA) of 0.45 to nearly 780 nm and which has been transmitted through the HD signal surface 22, from the beam incident surface 21a side, and the CD signal surface 25 is played back by a return light reflected thereon.

Next, as shown in FIG. 1C, a digital versatile disc-single layer (DVD-SL) 30 in which a signal surface is one layer type is constituted in the following manner. A disc substrate 31 having a thickness of about 0.6 mm and a reinforcing disc substrate 34 having a thickness of about 0.6 mm are stuck together by use of a resin material to form a disc having about 1.2 mm in total thickness. A DVD signal surface 32 is formed in a position apart by about 0.6 mm from a beam incident surface 31a on the lower disc substrate 31 by setting a pit width and a track pitch smaller than those of the CD 10 and attaching a total reflection film, and a protective film 33 is formed on the DVD signal surface 32.

Then, in the case of playing back the DVD-SL 30 in which the signal surface is one layer type, the DVD signal surface 32 is irradiated with a laser beam L2, of which a wavelength has been narrowed by an objective lens OB2 of a numerical aperture (NA) of 0.5 to 0.6 to nearly 650 nm, from the beam incident surface 31a side of the transparent disc substrate 31, and the DVD signal surface 32 is played back by a return light reflected thereon.

Next, as shown in FIG. 1D, a digital versatile disc-dual layer (DVD-DL) 40 in which a signal surface is two layer type is constituted in the following manner. First and second disc substrates 41, 46 set to about 0.6 mm in thickness are stuck together to form a disc of about 1.2 mm in total thickness by using transparent resin materials. A first DVD signal surface 42 is formed in a position apart by about 0.6 mm from a beam incident surface 41a on the lower first disc substrate 41 by setting a pit width and a track pitch smaller than those of the CD 10 and attaching a semi-transmissive reflection film, and a protective film 43 is formed on the first DVD signal surface 42. A second DVD signal surface 45 is formed on the upper second disc substrate 46 close to the first DVD signal surface 42 by setting a pit width and a track pitch smaller than those of the CD 10 and attaching a total reflection film, and a protective film 44 is attached below the second DVD signal surface 45.

Then, in the case of playing back the DVD-DL 40 in which the signal surface is two-layer type, the first DVD signal surface 42 or the second DVD signal surface 45 is irradiated with a laser beam L2, of which a wavelength has been narrowed by an objective lens OB2 of a numerical aperture (NA) of 0.5 to 0.6 to nearly 650 nm, from the beam incident surface 41a side of the transparent first disc substrate 41, and the first DVD signal surface 42 or the second DVD signal surface 45 is played back by a return light reflected thereon.

Incidentally, there are a device and a method for identifying an optical carrier, which can identify a type of an optical disc by selectively loading one of the CD 10, the hybrid SACD 20 and the DVD-SL 30 in which the signal surface is the one layer type, and using a detection signal from a photodetector disposed in an optical pickup (e.g., see pp. 2 to 6, FIG. 3 of Japanese Patent Application Laid-Open No.2000-293932).

FIG. 2 shows principle waveform charts for explaining a device and a method for identifying a carrier according to a conventional art.

The conventional carrier identifying device and method shown in FIG. 2 are disclosed in the above Japanese Patent Application Laid-Open No.2000-293932. Here, description will be made briefly by referring to this Publication and FIGS. 1A to 1D and FIG. 2.

According to the conventional optical carrier identifying device and method disclosed in the Japanese Patent Application Laid-Open No.2000-293932, as shown in (a) of FIG. 2, an objective lens disposed in an optical pickup is raised or lowered by a focus search driving signal relative to an optical disc mounted on a turntable.

During playing-back of the optical disc, a return light from a signal surface of the optical disc is received by a plurality of photodetection areas A to D in a photodetector disposed in the optical pickup and, subsequently, photodetection amounts of the plurality of photodetection areas A to D are all added to generate an all sum signal AS (described as a pull-in signal PI in the Publication). At this time, all sum signal AS=(A+B+C+D) is set.

Now, as shown in (b) of FIG. 2, in the case of playing back the CD 10 as an optical disc, since there is a roughly 1.2 mm distance from the beam incident surface 11a of the disc substrate 11 to the CD signal surface 12, all sum signals AS appear at positions I, III of the beam incident surface 11a and the CD signal surface 12. A identification signal DD similar to that shown in (c) of FIG. 2 is obtained when comparison is made to determine whether values of the all sum signals AS exceed a threshold value TH or not. Then, a pulse interval t1 between the two all sum signals AS is measured to identify the optical disc as a CD.

Next, as shown in (d) of FIG. 2, in the case of playing back the DVD-SL 30 in which the signal surface is one layer type as an optical disc, since there is a roughly 0.6 mm distance from the beam incident surface 31a of the first disc substrate 31 to the DVD signal surface 32, all sum signals AS appear at positions I, II of the beam incident surface 31a and the DVD signal surface 32. A identification signal DD similar to that shown in (e) of FIG. 2 is obtained when comparison is made to determine whether values of the all sum signals AS exceed a threshold value TH or not. Then, a pulse interval t2 between the two all sum signals AS is measured to identify the optical disc as a DVD. In this event, for example, if time tTH is held as a reference value which is an intermediate value between the measured values t1 and t2, a measured value tx is compared with the time tTH to determine whether the measured value tx is t1 or t2. That is, it is possible to identify whether the optical disc is a CD 10 or a DVD-SL 30.

Next, as shown in (f) of FIG. 2, in the case of playing back the hybrid SACD 20 as an optical disc, since the HD signal surface 22 is at a position of about 0.6 mm from the beam incident surface 21a of the first disc substrate 21, and the CD signal surface 25 is located apart by about 0.6 mm from this HD signal surface 22, all sum signals AS appear at positions I, II, III of the beam incident surface 21a, the HD signal surface 22 and the CD signal surface 25. A identification signal DD similar to that shown in (g) of FIG. 2 is obtained when comparison is made to determine whether values of the all sum signals AS exceed a threshold value TH or not. Then, pulse intervals t3, t4 among the three all sum signals AS are measured to identify the optical disc as a hybrid SACD.

Meanwhile, according to the optical carrier identifying device and method disclosed in the Japanese Patent Application Laid-Open No. 2000-293932, it is possible to identify the types of the CD 10, the DVD-SL 30 in which the signal surface is one layer type, and the hybrid SACD 20. However, three types of signal processing circuits are necessary, i.e., a CD signal processing circuit, a DVD signal processing circuit, and a hybrid SACD signal processing circuit. Consequently, signal processing circuitry of the optical carrier identifying device becomes complex, and the optical carrier identifying device becomes expensive.

SUMMARY OF THE INVENTION

Thus, paying attention to the hybrid SACD 20 in which the HD signal surface 22 and the CD signal surface 25 are formed, if the CD signal surface 25 only is played back without playing back the HD signal surface 22 with compatibility to the CD 10, only two types of signal processing circuits, i.e., the CD signal processing circuit and the DVD signal processing circuit, are necessary. Therefore, the device can be provided inexpensively. In this case, in contrast to the case described above referring to FIG. 1B, the hybrid SACD 20 must be identified as simply a CD because it is necessary to irradiate only the CD signal surface 25 of the hybrid SACD 20 with the laser beam L1 whose wavelength is near 780 nm. Accordingly, there is a demand for an optical disc device and a method of identifying a type of an optical disc which can identify not only the CD 10 as a CD and the DVD-SL 30 or the DVD-DL 40 as a DVD but also the hybrid SACD 20 that has the HD signal surface 22 and the CD signal surface 25 as simply a CD.

In order to achieve the foregoing object, there is provided a method of identifying a type of an optical disc loaded in an optical disc device that enables selective loading of a CD (Compact Disc), a hybrid SACD (Super Audio CD) and a DVD (Digital Versatile Disc) among optical discs, in which the type of the optical disc is identified by irradiating an optical disc of an unknown type with a laser beam through an objective lens from a beam incident surface side, receiving a return light from a signal surface of the unknown optical disc in a plurality of photodetection areas of a photodetector in the middle of raising or lowering the objective lens placed on standby at a lens midpoint between a lower lens bottom point and an upper lens top point based on a focus search driving signal during focus searching, and adding all photodetection amounts of the plurality of photodetection areas. This method is characterized by including: presetting and storing an all sum signal value AS-cdref for CD signal surface reference for identifying the CD and the hybrid SACD as a CD based on respective CD signal surfaces thereof; acquiring a focus search driving voltage Q corresponding to a DVD signal surface to previously store the same when a reference DVD is used and a return light from the DVD signal surface thereof located at a position of about 0.6 mm from the beam incident surface thereof is received by the photodetector; acquiring a focus search driving voltage R corresponding to a CD signal surface to previously store the same when a reference CD is used and a return light from the CD signal surface thereof located at a position of about 1.2 mm from the beam incident surface thereof is received by the photodetector; acquiring an all sum signal value AS-max by the photodetector on the signal surface of the unknown optical disc, and comparing the all sum signal value AS-max with the all sum signal value AS-cdref for the CD signal surface reference; acquiring a focus search driving voltage Y corresponding to the signal surface of the unknown optical disc when the return light from the signal surface thereof is received by the photodetector, and comparing the focus search driving voltage Y with a voltage value acquired by a predetermined relational expression between the focus search driving voltage Q and the focus search driving voltage R; and identifying the unknown optical disc as a CD when the all sum signal value AS-max is larger than the all sum signal value AS-cdref for the CD signal surface reference, and the focus search driving voltage Y is larger than the voltage value acquired by the predetermined relational expression.

According to a preferred embodiment of the present invention, the unknown optical disc is identified as a CD when AS-max>AS-cdref and Y>(Q+2R)/3 are satisfied.

Furthermore, in order to achieve the foregoing object, there is provided an optical disc device in which a CD (Compact Disc), a hybrid SACD (Super Audio CD) and a DVD (Digital Versatile Disc) among optical discs are selectively loaded, and a type of an optical disc is identified by irradiating an optical disc of an unknown type with a laser beam through an objective lens from a beam incident surface side, receiving a return light from a signal surface of the unknown optical disc in a plurality of photodetection areas of a photodetector in the middle of raising or lowering the objective lens placed on standby at a lens midpoint between a lower lens bottom point and an upper lens top point based on a focus search driving signal during focus searching, and adding all photodetection amounts of the plurality of photodetection areas. This optical disc device is characterized by including: focus search driving signal generation means for receiving respective return lights from a DVD signal surface located at a position of about 0.6 mm from the beam incident surface by using a reference DVD, from a CD signal surface located at a position of about 1.2 mm from the beam incident surface by using a reference CD, and from the signal surface of the unknown optical disc by the photodetector, and acquiring focus search driving voltages Q, R and Y corresponding to the respective signal surfaces; photodetector signal processing means for acquiring an all sum signal value AS-max by the photodetector on the signal surface of the unknown optical disc; storing means for prestoring an all sum signal value AS-cdref for CD signal surface reference preset for identifying the CD and the hybrid SACD as a CD based on respective CD signal surfaces thereof, the focus search driving voltage Q corresponding to the DVD signal surface of the reference DVD, and the focus search driving voltage R corresponding to the CD signal surface of the reference CD; arithmetic operation means for comparing the all sum signal value AS-max with the all sum signal value AS-cdref for the CD signal surface reference, and comparing the focus search driving voltage Y corresponding to the signal surface of the unknown optical disc with a voltage value acquired by a predetermined relational expression between the focus search driving voltage Q and the focus search driving voltage R; and optical disc type identification means for identifying the unknown optical disc as a CD when the all sum signal value AS-max is larger than the all sum signal value AS-cdref for the CD signal surface reference, and the focus search driving voltage Y is larger than the voltage value acquired by the predetermined relational expression.

According to a preferred embodiment of the present invention, the unknown optical disc is identified as a CD when AS-max>AS-cdref and Y>(Q+2R)/3 are satisfied.

The nature, principle and utility of the invention will become more apparent from the following detailed description when read in conjunction with the accompanying drawings.

BRIEF DESCRIPTION OF THE DRAWINGS

In the accompanying drawings:

FIG. 13 is a schematic operation view showing the operation of identifying the type of the unknown optical disc when focus searching is carried out by using the semiconductor laser for DVD;

FIG. 17 is a flowchart (3) of identifying the type of the unknown optical disc by starting the semiconductor laser for CD first.

DESCRIPTION OF THE PREFERRED EMBODIMENTS

Figure 1A:
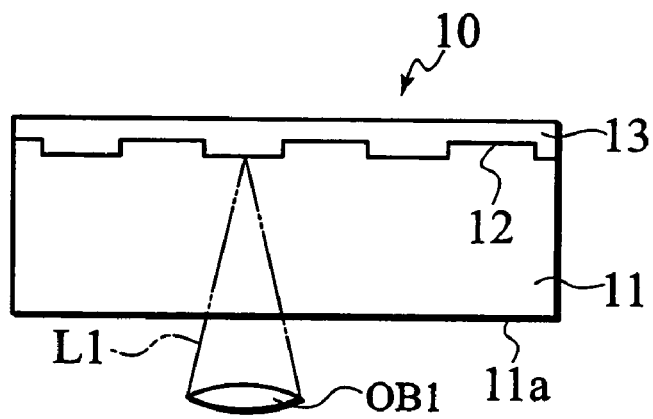
FIGS. 1A to 1D are schematic views explaining types of optical discs, FIG. 1A showing a CD, FIG. 1B showing a hybrid SACD, FIG. 1C showing a DVD-SL in which a signal surface is a 1-layer type, and FIG. 1D showing a DVD-DL in which a signal surface is a 2-layer type.
Figure 1B:
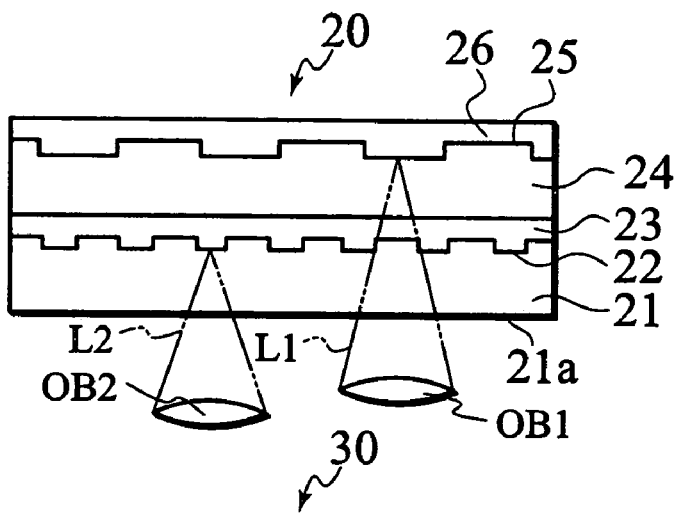
Figure 1C:
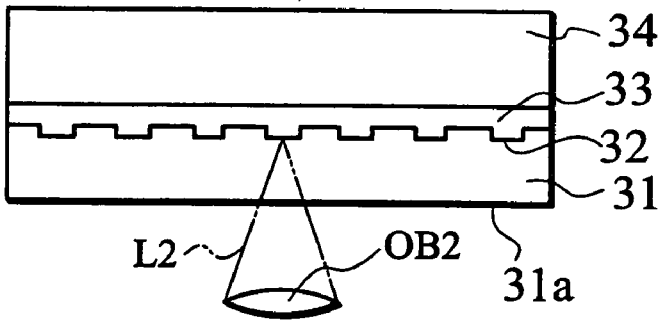
Figure 1D:
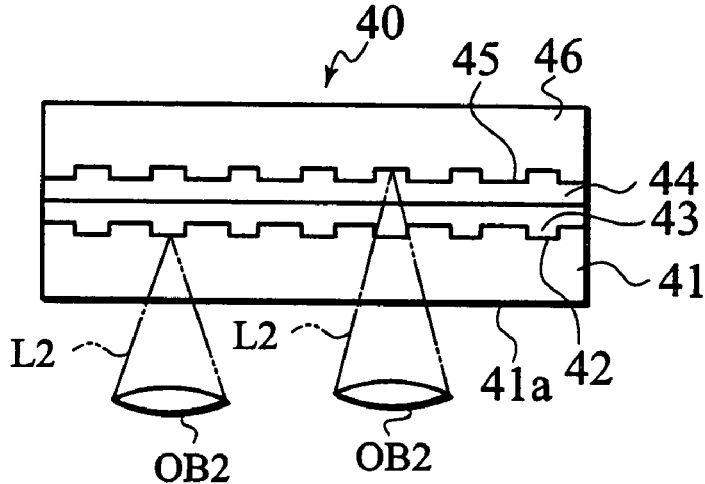
Figure 2:
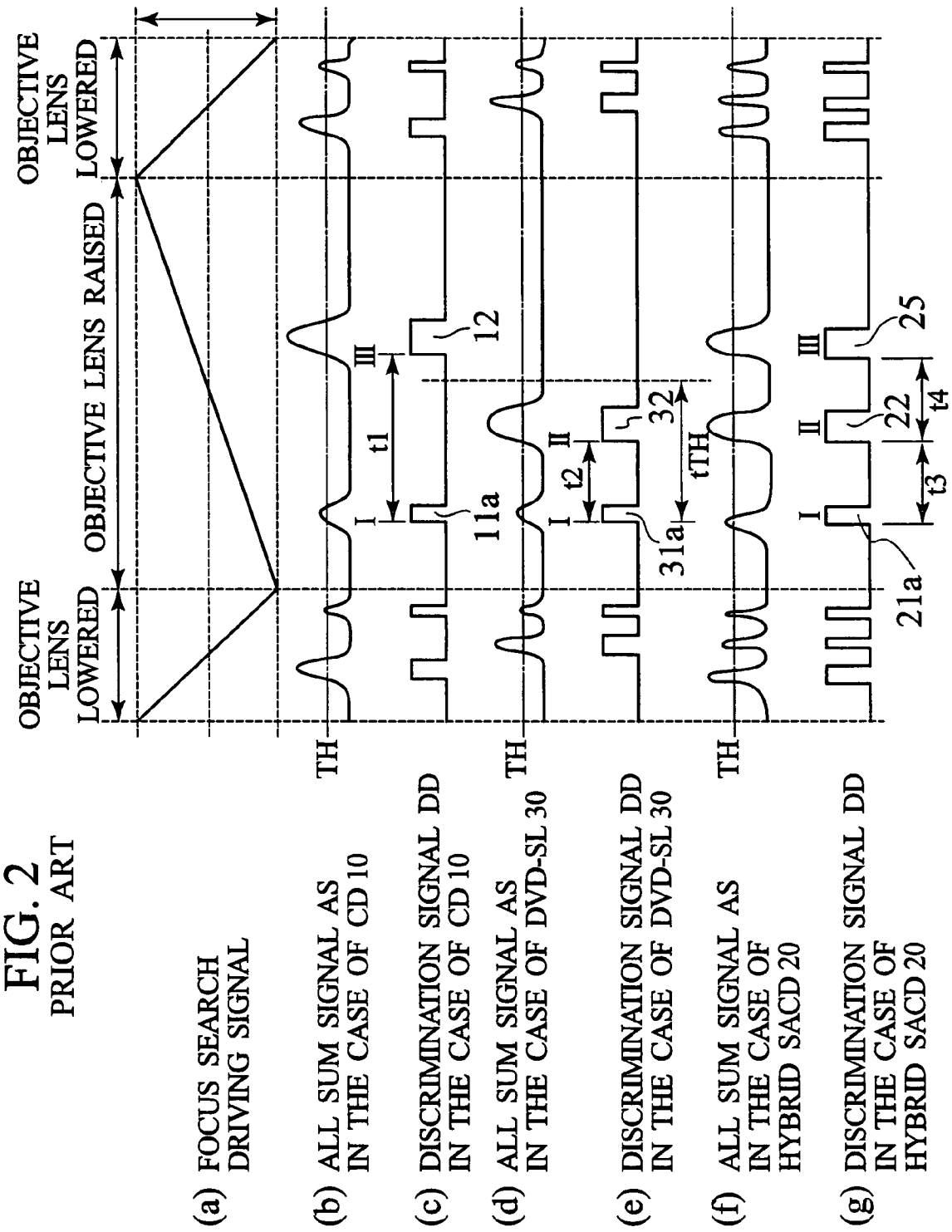
FIG. 2 shows principle waveform charts explaining a device and a method for identifying a carrier according to a conventional art.

Hereinafter, detailed description will be made of an embodiment of a method of identifying a type of an optical disc and an optical disc device according to the present invention with reference to FIGS. 3 to 16. Note that, in the description below, members similar to those described above with reference to FIGS. 1A to 1D will be denoted by the same reference numerals.

Figure 3:
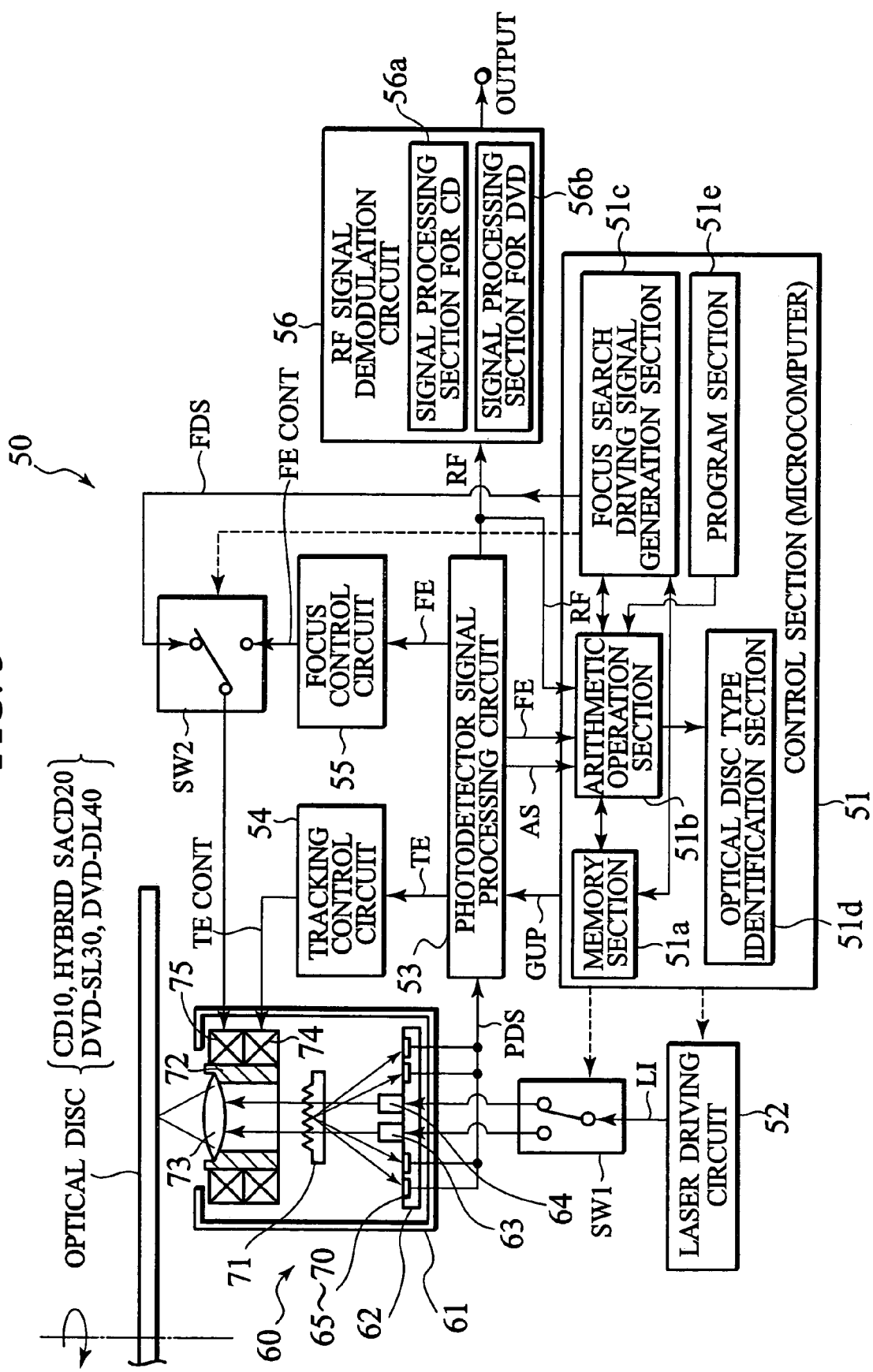
FIG. 3 is a constitutional view showing an entire constitution of an optical disc device according to the present invention.
Figure 4:
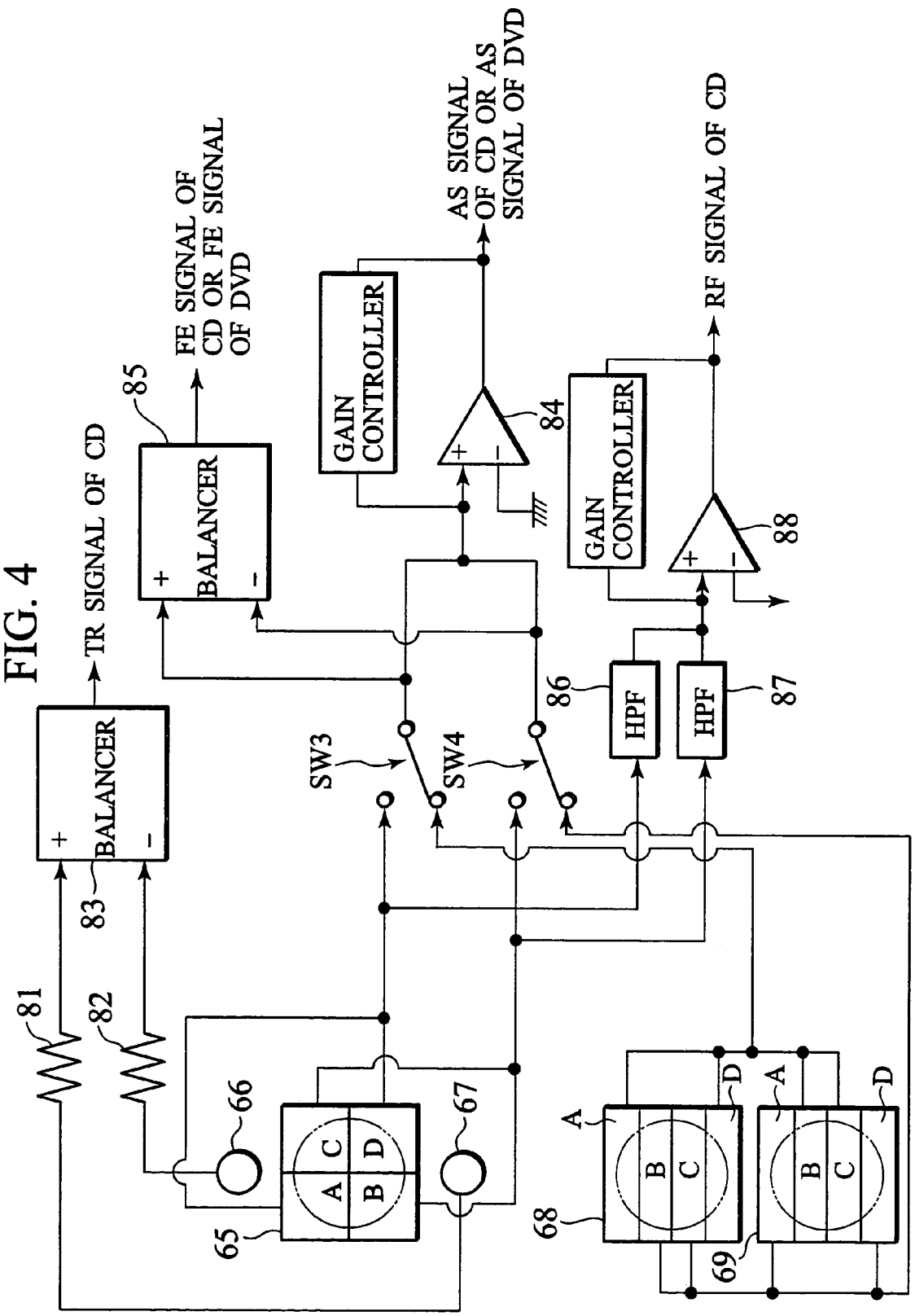
FIG. 4 is a circuit diagram showing a circuit for generating a TR signal of a CD, an FE signal of the CD or a DVD, an AS signal of the CD or the DVD, and an RF signal of the CD in a photodetector signal processing circuit shown in FIG. 3.
Figure 5:
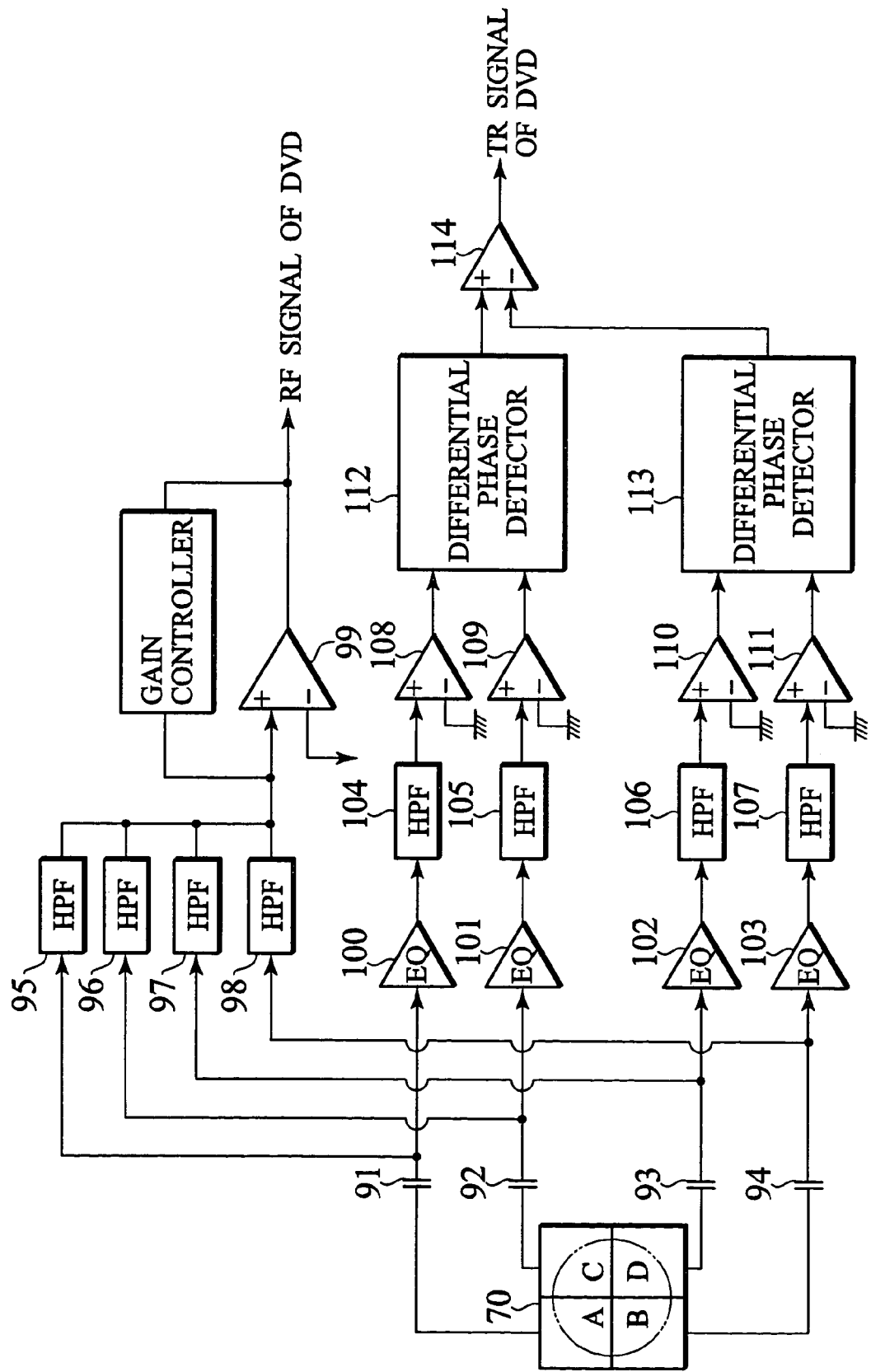
FIG. 5 is a circuit diagram showing a circuit for generating an RF signal of the DVD, and a TR signal of the DVD in the photodetector signal processing circuit shown in FIG. 3.

FIG. 3 is a block diagram showing an entire constitution of an optical disc device according to the present invention. FIG. 4 is a circuit diagram showing a circuit for generating a TR signal of a CD, an FE signal of the CD or a DVD, an AS signal of the CD or the DVD, and an RF signal of the CD in a photodetector signal processing circuit shown in FIG. 3. FIG. 5 is a circuit diagram showing a circuit for generating an RF signal of the DVD, and a TR signal of the DVD in the photodetector signal processing circuit shown in FIG. 3.

As shown in FIG. 3, in an optical disc device 50 of the present invention, the CD 10, the hybrid SACD 20, the DVD-SL 30 in which the signal surface is the one layer type, and the DVD-DL 40 in which the signal surface is the two-layer type described above with reference to FIGS. 1A to 1D can be selectively loaded on a turntable (not shown) as the optical discs, and these various optical discs can be rotated integrally with the turntable by an unillustrated spindle motor. In the optical disc device 50, priority is given to the DVD-SL 30 and the DVD-DL 40 as main use, while the CD 10 and the hybrid SACD 20 are set as sub-use. The hybrid SACD 20 that has an HD signal surface 22 and a CD signal surface 25 is treated simply as a CD. Thus, the optical disc device 50 is provided inexpensively.

In the optical disc device 50, a control section 51 is disposed to control the entire device by using a microcomputer. In this case, the control section 51 includes the following functional sections: a memory section 51a, an arithmetic operation section 51b, a focus search driving signal generation section 51c, an optical disc type identification section 51d, and a program section 51e. These sections in the control section 51 will be described as necessary.

Below the optical disc, an optical pickup 60 is disposed to be movable in a diameter direction of the optical disc by the unillustrated spindle motor.

The optical pickup 60 includes a semiconductor laser 63 for CD for irradiating the CD 10 and the hybrid SACD 20 with a laser beam of which wavelength is near 780 nm, and a semiconductor laser 64 for DVD for irradiating the DVD-SL 30 and the DVD-DL 40 with a laser beam of which wavelength is near 650 nm. These semiconductor lasers 63 and 64 are installed to be very slightly apart from each other left and right setting an optical axis of an objective lens 73 as a center on a semiconductor substrate (Si substrate) 62 disposed in a lower side of an optical pickup casing 61.

On both left and right sides of the semiconductor laser 63 for CD and the semiconductor laser 64 for DVD, a plurality of photodetectors 65 to 70 are integrally formed on the semiconductor substrate 62.

Additionally, a hologram 71 is disposed above the semiconductor laser 63 for CD and the semiconductor laser 64 for DVD. Further, the objective lens 73 attached to a lens holder 72 is supported above the hologram 71 to be swingable in a tracking direction and a focusing direction through an unillustrated suspension wire. In this case, the objective lens 73 is formed to set a numerical aperture (NA) of 0.45 for the CD 10 and the hybrid SACD 20, and a numerical aperture (NA) of 0.5 to 0.6 for the DVD-SL 30 and the DVD-DL 40. Such an objective lens 73 may be referred to as a special objective lens.

Moreover, a tracking coil 74 and a focusing coil 75 are fixed to an outer peripheral surface of the lens holder 72 to which the objective lens 73 has been attached. The tracking coil 74 is for controlling the objective lens 73 integrally with the lens holder 72 in the tracking direction, while the focusing coil 75 is for controlling the objective lens 73 integrally with the lens holder 72 in the focusing direction.

At the time of starting the optical disc device 50, the priority is given to the DVD-SL 30 and the DVD-DL 40 in the optical disc device 50 as described above. Accordingly, a laser driving circuit 52 is actuated by a command from the control section (microcomputer) 51 and then a laser driving current LI generated in the laser driving circuit 52 is applied to the semiconductor laser 64 for DVD through a switch SW 1. A laser beam of near 650 nm emitted from the semiconductor laser 64 for DVD is transmitted through the hologram 71 to enter the objective lens 73. The laser beam narrowed by the objective lens 73 is irradiated onto a signal surface of an optical disc. Subsequently, a return light reflected on the signal surface of the optical disc is passed through the objective lens 73, and diffracted to a plurality of optical paths by the hologram 71 to be received by the plurality of photodetectors 65 to 70.

In this event, at the time of starting the optical disc device 50, the semiconductor laser 64 for DVD is started first, and the laser beam from the semiconductor laser 64 for DVD is used to identify a type of the optical disc as described later. When a result of the identification shows that the optical disc is a CD, the semiconductor laser 63 for CD is started.

Incidentally, an operation opposite to the above is possible. That is, at the time of starting the optical disc device 50, the Semiconductor laser 63 for CD is started first, a laser beam from the semiconductor laser 63 for CD is used to identify a type of the optical disc and, when a result of the identification shows that the disc is a DVD, the semiconductor laser 64 for DVD is started.

Additionally, photodetector detection signals PDS obtained by receiving the return light reflected on the signal surface of the optical disc at the plurality of photodetectors 65 to 70 disposed in the optical pickup 60 are inputted to a photodetector signal processing circuit 53 to generate a tracking error signal TE (may be referred to as a TE signal hereinafter), a focusing error signal FE (may be referred to as an FE signal hereinafter), a data reproducing signal RF (may be referred to as an RF signal hereinafter), and an all sum signal AS (may be referred to as an AS signal hereinafter) therein as described later.

Note that when the signals are processed in the photodetector signal processing circuit 53, the signals are processed for the CD when the CD 10 or the hybrid SACD 20 is played back and for the DVD when the DVD-SL 30 or the DVD-DL 40 is played back in accordance with a command from the control section 51.

Now, the signal processing in the photodetector signal processing circuit 53 will be described more specifically. The plurality of photodetectors disposed in the optical pickup 60 include a pair of sub-photodetectors 66, 67 disposed front and back of a 4-division type photodetector 65 in the tracking direction to obtain a TR signal of a CD, one 4-division type photodetector 65 disposed to obtain an FE signal, an AS signal and an RF signal of the CD, and a pair of 4-division type photodetectors 68, 69 disposed to obtain an FE signal and an AS signal of a DVD as shown in FIG. 4, and one 4-division type photodetector 70 disposed to obtain an RF signal and a TR signal of the DVD as shown in FIG. 5.

First, as shown in FIG. 4, the TR signal of the CD is obtained by using a well-known 3-beam method to input photodetection outputs of the pair of sub-photodetectors 66, 67 through resistors 81, 82 to a balancer 83, and detecting a difference between both outputs at the balancer 83.

The all sum signal AS that is a main part of the present invention includes an AS signal of the CD and an AS signal of the DVD, and is obtained by selectively switching the AS signals thereof by switches SW3, SW4. In this event, the switches SW3, SW4 are switched to obtain the AS signal of the DVD first at the time of starting the optical disc device 50. Subsequently, the switches SW3, SW4 are switched to obtain the AS signal of the CD when a type of the optical disc is identified as a CD.

The AS signal of the CD is obtained by using a well-known push-pull method to add all photodetection amounts of 4-division photodetection areas A to D arranged in a cross shape in one 4-division type photodetector 65, and a signal band of the AS signal of the CD is 100 KHz or lower.

That is, since the FE signal of the CD (described later) is simultaneously obtained, division is first made into an (A+D) area and a (B+C) area, and the AS signal of the CD is obtained as (A+B+C+D) by adding all photodetection outputs of the (A+D) area and the (B+C) area through the switches SW3, SW4 at an adder 84.

On the other hand, the AS signal of the DVD is obtained by using a well-known spot size method (SSD method) to add all photodetection amounts of 4-division photodetection areas A to D arranged in parallel in the pair of 4-division type photodetectors 68, 69, and a signal band of the AS signal of the DVD is 100 KHz or lower.

That is, since the FE signal of the DVD (described later) is simultaneously obtained, division is first made into a first group of {(B+C) area of 4-division type photodetector 68}+{(A+D) of 4-division type photodetector 69} and a second group of {{A+D} area of 4-division type photodetector 68}+{(B+C) of 4-division type photodetector 69}. Then, the AS signal of the DVD is obtained as {(A+B+C+D) of 4-division type photodetector 68}+{(A+B+C+D) of 4-division type photodetector 69} by adding all photodetection outputs of the first and second groups through the switches SW3, SW4 at the adder 84.

The FE signal of the CD or the DVD is obtained by inputting outputs from the switches SW3 and SW4, connected to the 4-division type photodetector 65 or the pair of 4-division type photodetectors 68, 69, to a balancer 85, and detecting a difference between both outputs at the balancer 85.

Additionally, the RF signal of the CD is obtained by adding all photodetection amounts of the photodetection areas A to D of the 4-division type photodetector 65. However, the RF signal is a signal of an MHz order having a different signal band from the all sum signal AS of the CD. Here, the RF signal is obtained by adding all photodetection outputs of the (A+D) area and the (B+D) area of the 4-division type photodetector 65 through HPFs 86, 87 at an adder 88.

Next, as shown in FIG. 5, the RF signal of the DVD is obtained by adding all photodetection amounts of the photodetection areas A to D of the 4-division type photodetector 70, and a signal band thereof is an MHz order. That is, the RF signal of the DVD is obtained by adding all photodetection outputs of the 4-division photodetection areas A to D arranged in a cross shape in the 4-division type photodetector 70 through capacitors 91 to 94 and HPFs 95 to 98 at an adder 99.

Further, the TR signal of the DVD is obtained in the following manner. The photodetection outputs of the 4-division photodetection areas A to D arranged in the cross shape in the 4-division type photodetector 70 are passed through the capacitors 91 to 94, equalizer amplifiers 100 to 103, HPFs 104 to 107, and operational amplifiers 108 to 111. An output of the operational amplifier 108 corresponding to the A area and an output of the operational amplifier 109 corresponding to the C area are inputted to a first differential phase detector 112, and an output of the operational amplifier 110 corresponding to the D area and an output of the operational amplifier 111 corresponding to the B area are inputted to a second differential phase detector 113. Then, outputs of the first and second differential phase detectors 112, 113 are subtracted by a subtracter 114.

Returning to FIG. 3, at the time of reproducing data from an optical disc by rotating the same at a high speed (referred to as during data reproduction of the optical disc hereinafter), the tracking error signal TE obtained in the photodetector signal processing circuit 53 is inputted to a tracking control circuit 54, and a tracking control signal TE CONT generated therein is supplied to the tracking coil 74 attached to the lens holder 72. Accordingly, the objective lens 73 is controlled integrally with the lens holder 72 in the tracking direction with respect to the optical disc by a magnetic force of the tracking coil 74 and an unillustrated magnet.

Moreover, during the data reproduction of the optical disc, the focus error signal FE obtained in the photodetector signal processing circuit 53 is inputted to a focus control circuit 55, and a focus control signal FE CONT generated therein is supplied through a switch SW2 to the focus coil 75 attached to the lens holder 72. Accordingly, the objective lens 73 is controlled integrally with the lens holder 72 in the focusing direction with respect to the optical disc by a magnetic force of the focus coil 75 and an unillustrated magnet.

Further, the focus error signal FE obtained in the photodetector signal processing circuit 53 is inputted to the arithmetic operation section 51b in the control section 51, and determination is made as to whether a gain of a signal system is increased or not based on a peak-peak (p-p) value of the focus error signal FE during type identification of the optical disc. This operation will be described later, and thus explanation thereof is omitted here.

During the data reproduction of the optical disc, the data reproducing signal RF obtained in the photodetector signal processing circuit 53 is inputted to an RF signal demodulation circuit 56, and inside the circuit, one of a CD signal processing section 56a and a DVD signal processing section 56b is actuated based on a command from the control section 51 to demodulate and output the data reproducing signal RF corresponding to the type of the optical disc based on a predetermined format.

Further, the data reproducing signal RF obtained in the photodetector signal processing circuit 53 is inputted to the arithmetic operation section 51b in the control section 51, and a track state is detected from an envelope of the data reproducing signal RF to identify a DVD or a CD. However, this operation will be described later, and thus explanation thereof is omitted here.

Next, description will be made of an operation of setting a working range of the objective lens 73, which is a main part of the present invention, during focus searching on the optical disc by the objective lens 73 with reference to FIGS. 6 to 9.

Figure 6:
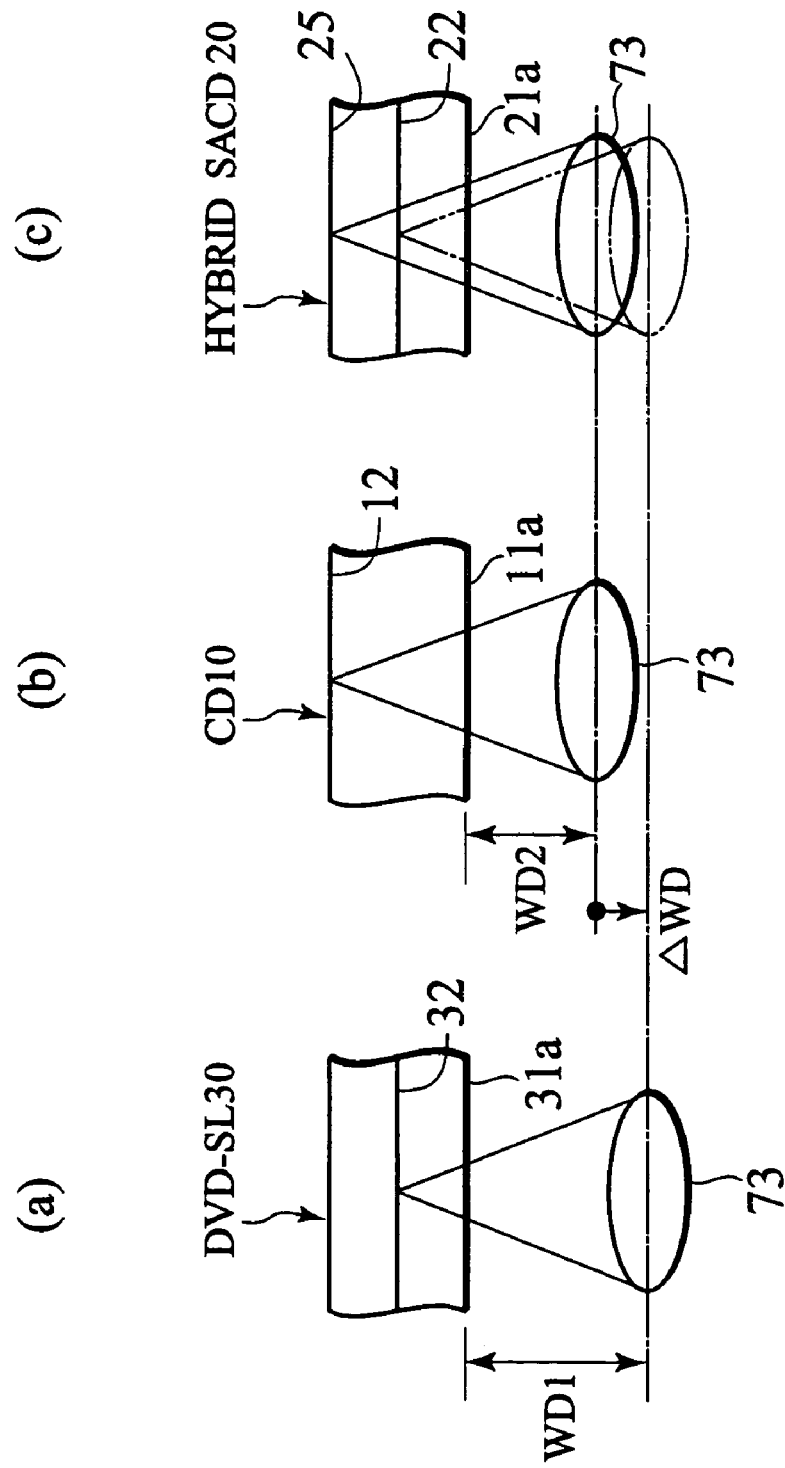
FIG. 6 is a schematic view explaining a working distance of an objective lens.
Figure 7:
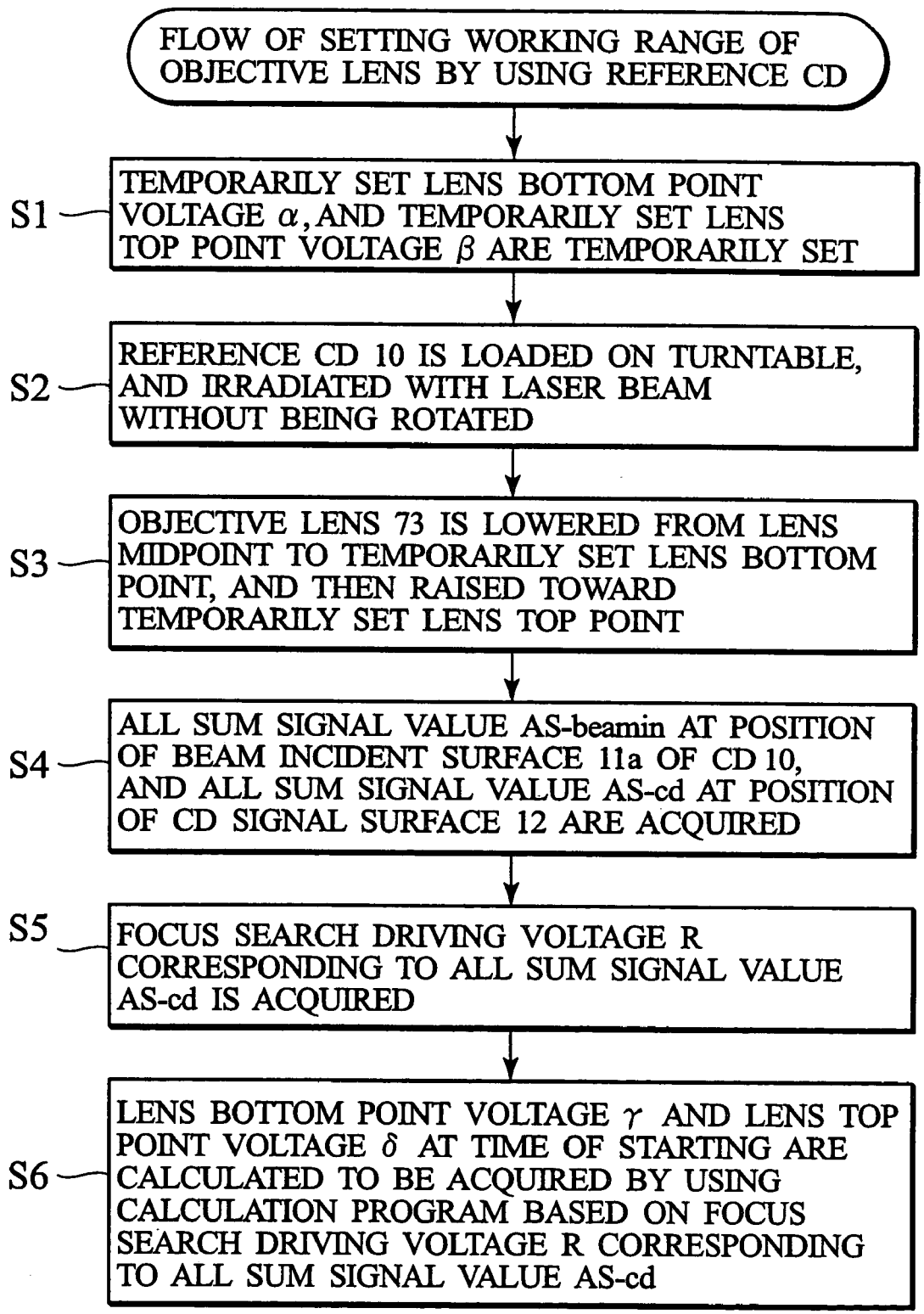
FIG. 7 is a flowchart explaining an operation of setting a working range of the objective lens by using a reference CD.
Figure 8:
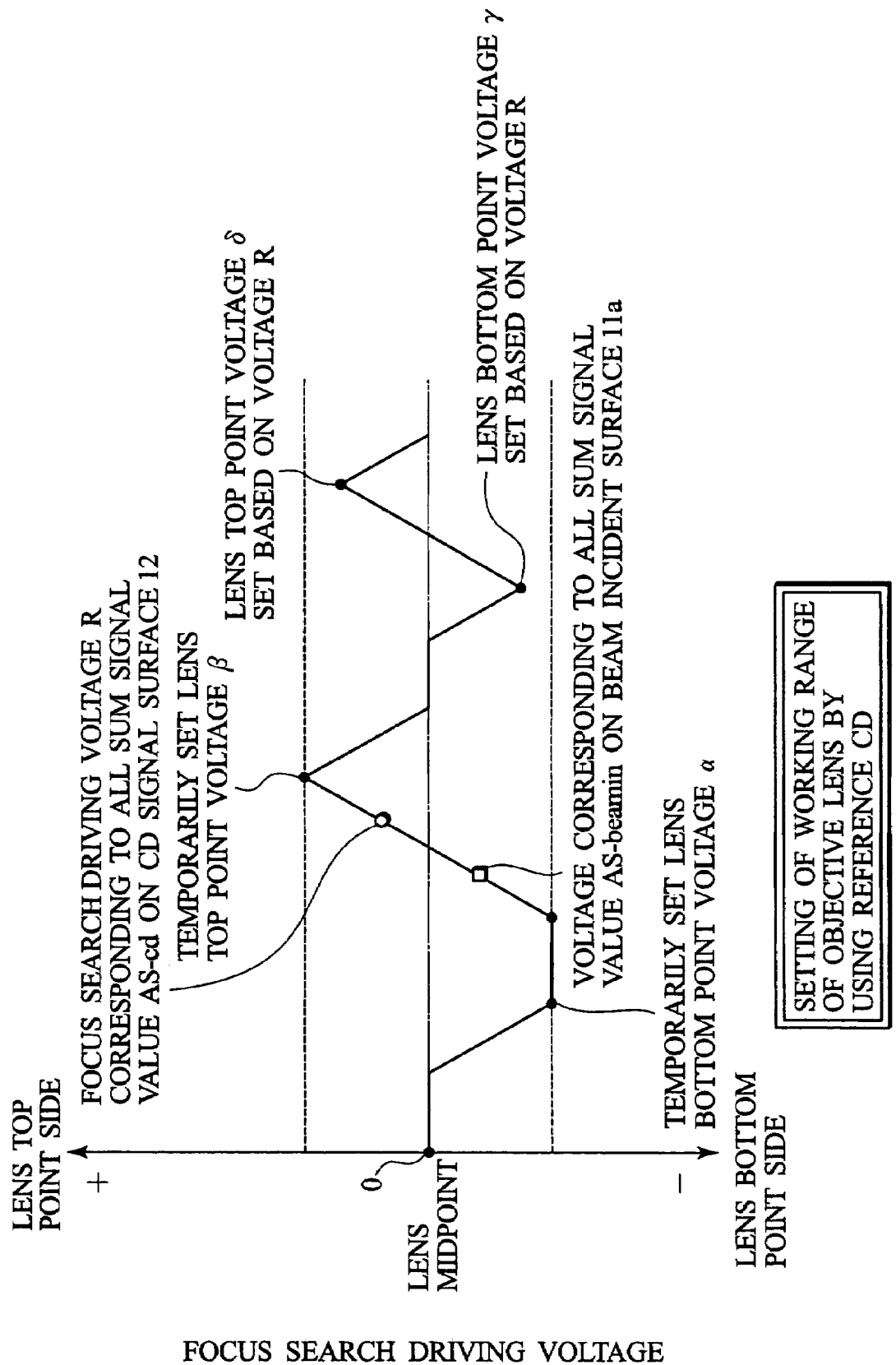
FIG. 8 is a schematic operation view explaining, the operation of setting the working range of the objective lens by using the reference CD.
Figure 9:
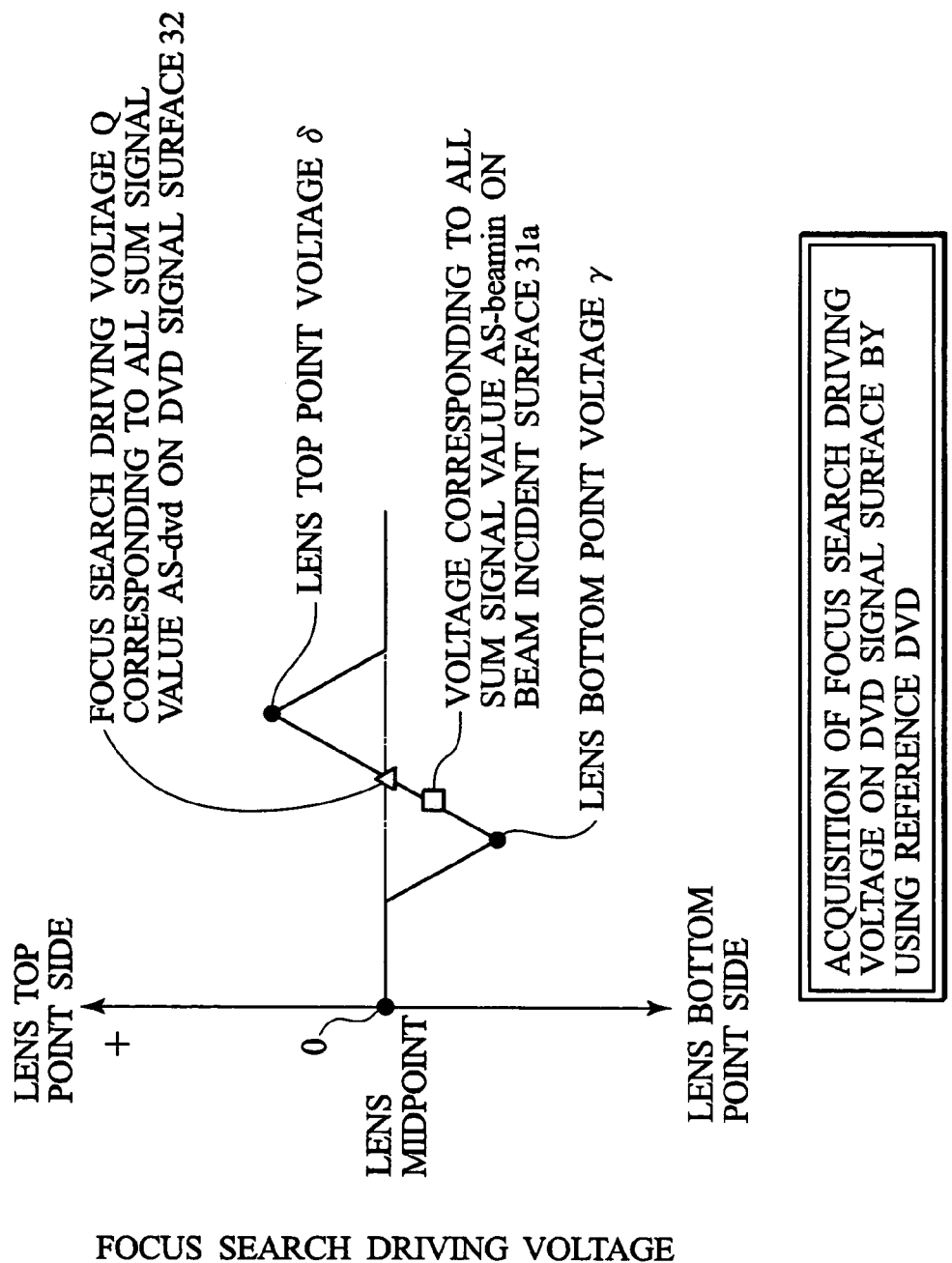
FIG. 9 is a schematic operation view explaining an operation of acquiring a focus search driving voltage corresponding to a DVD signal surface by using a reference DVD after the working range of the objective lens is set.

FIG. 6 is a schematic view for explaining a working distance of the objective lens: (a) in the figure shows a case of the DVD-SL, (b) shows a case of the CD, and (c) shows a case of the hybrid SACD. FIG. 7 is a flowchart for explaining an operation of setting a working distance of the objective lens by using a reference CD. FIG. 8 is a schematic operation view for explaining the operation of setting the working range of the objective lens by using the reference CD. FIG. 9 is a schematic operation view for explaining an operation of obtaining a focus search driving voltage corresponding to a DVD signal surface by using a reference DVD after the working range of the objective lens is set.

Note that, description below is made regarding a case in which the semiconductor laser 64 for DVD is started first. However, the invention is not limited to this case, and the semiconductor laser 63 for CD may be started first as long as the operation is based on the same technical idea.

The working distance of the objective lens 73 disposed in the optical pickup 60 will be described before explanation of the operation of setting the working range thereof. As shown in (a) of FIG. 6, when the objective lens 73 is focused on the DVD signal surface 32 of the DVD-SL 30, a distance between a center of the objective lens 73 and the beam incident surface 31a of the DVD-SL 30, i.e., a working distance, becomes WD1 in design.

Moreover, as shown in (b) of FIG. 6, when the objective lens 73 is focused on the CD signal surface 12 of the CD 10, a distance between the center of the objective lens 73 and the beam incident surface 11a of the CD 10, i.e., a working distance, becomes WD2 in design. In the case of the CD 10, the objective lens 73 is raised more by Δ WD toward the beam incident surface 11a side of the CD 10 than that in the case of the DVD-SL 30.

Further, as shown in (c) of FIG. 6, when the objective lens 73 is focused on the CD signal surface 25 of the hybrid SACD 20, a working distance is similar to that in the case of the CD 10. Pulling-in is executed on the CD signal surface 25 by the objective lens 73, while no pulling-in is executed on the HD signal surface 22 by the objective lens 73.

Next, description will be made of working range setting of the objective lens 73 during focus searching with reference to FIGS. 3, 7 and 8. The working range setting operation of the objective lens 73 is carried out before the optical disc device 50 is shipped from a factory.

Here, as shown in FIG. 3, during focus searching executed before the data signal reproducing operation of the optical disc, a focus search driving signal FDS is generated by the focus search driving signal generation section 51c disposed in the control section 51, and the focus search driving signal FDS is supplied through the switch SW2 to the focus coil 75 attached to the lens holder 72. Accordingly, the objective lens 73 is driven integrally with the lens holder 72 in the focusing direction with respect to the optical disc in accordance with the focus search driving signal FDS.

While the focus search driving signal FDS is not applied to the focus coil 75 from the focus search driving signal generation section 51c disposed in the control section 51, the objective lens 73 has reached a position (natural position) of a lens midpoint as shown in FIG. 8.

When focus searching is carried out on the optical disc by the objective lens 73, a laser beam is focused on the signal surface of the optical disc in the middle of raising or lowering the objective lens 73 placed on standby at the lens midpoint between a lower lens bottom point and an upper lens top point by a focus search driving signal. However, in the case of a constitution in which the CD 10, the hybrid SACD 20, the DVD-SL 30 and the DVD-DL 40 can be selectively loaded, generally, the lens bottom point of the objective lens 73 is set on a lower position that has more sufficient room than the working distance WD1 (FIG. 6) for the DVD-SL 30, while the lens top point of the objective lens 73 is set on a position slightly before abutting on the beam incident surface of the optical disc. Consequently, a moving range of the objective lens 73 is large during focus searching, thus extending moving time thereof.

Therefore, in the present invention, a focus search algorithm has been developed to enable quick transfer to a data reproducing operation after focus searching by setting a moving range of the objective lens 73 small during focus searching to shorten moving time thereof.

That is, as shown in FIGS. 7 and 8, in the case of setting a moving range of the objective lens 73 during focus searching, a temporarily set lens bottom point voltage α and a temporarily set lens top point voltage β are temporarily set in step S1. In other words, a temporarily set lens bottom point corresponding to the temporarily set lens bottom point voltage a is temporarily set on a position that has more sufficient room than the working distance WD1 (FIG. 6) for the DVD-SL 30 as in the above-described general case. A temporarily set lens top point corresponding to the temporarily set lens top point voltage β is also temporarily set on a position slightly before abutting on the beam incident surface of the optical disc as in the above-described general case. Accordingly, a moving range of the objective lens 73 becomes a large value from the temporarily set lens bottom point to the temporarily set lens top point during the temporary setting. In this event, if a focus search driving voltage corresponding to the lens midpoint (natural position) of the objective lens 73 is a reference voltage 0, a voltage value on the lens bottom point side becomes minus (−), and a voltage value on the lens top point side becomes plus (+).

Next, in step S2, a reference CD 10 is prepared first in which a CD signal surface 12 is located at a position of about 1.2 mm from a beam incident surface 11a. The CD 10 is loaded on a turntable (not shown), and the semiconductor laser 64 for DVD is started in a nonrotated state of the CD 10 to irradiate an innermost peripheral side of the CD 10 with a laser beam narrowed by the objective lens 73 from the beam incident surface 11a side of the CD 10. Here, since an all sum signal value AS-cd of a return light reflected on the CD signal surface is used in the case of setting the moving range of the objective lens 73, the CD 10 in which the CD signal surface 12 has been formed is used as a reference optical disc.

Next, in step S3, the objective lens 73 placed on standby at the lens midpoint is lowered to the temporarily set lens bottom point in accordance with the temporarily set lens bottom point voltage α while the CD 10 in the rotation stopped state is irradiated with a laser beam from the objective lens 73. Then, the objective lens 73 is raised from the temporarily set lens bottom point toward the temporarily set lens top point in accordance with the temporarily set lens top point voltage β. Note that, an operation opposite to the above is possible. That is, the objective lens 73 placed on standby at the lens midpoint may be raised to the temporarily set lens top point, and then the objective lens 73 may be lowered from the temporarily set lens top point toward the temporarily set lens bottom point.

Next, in step S4, if an all sum signal AS from the photodetector signal processing circuit 53 is inputted to the arithmetic operation section 51b in the control section 51 to be monitored in the middle of raising the objective lens 73, a small all sum signal value AS-beamin is first obtained at the position of the beam incident surface 11a of the CD 10. When the objective lens 73 is raised more, a large all sum signal value AS-cd is obtained at the position of the CD signal surface 12. In this event, when the large all sum signal value AS-cd is obtained at the position of the CD signal surface 12 of the CD 10, it means that the objective lens 73 has been focused by keeping a predetermined working distance to the beam incident surface 11a of the CD 10.

Next, in step S5, the all sum signal value AS-cd obtained at the position of the signal surface 12 is inputted to the focus search driving signal generation section 51c in the control section 51. A focus search driving voltage R corresponding to the all sum signal value AS-cd is obtained to be stored in the memory section 51a in the control section 51. This focus search driving voltage R is used for setting a moving range of the objective lens 73 and identifying a type of the optical disc, which will be described later.

Subsequently, in step S6, the arithmetic operation section 51b of the control section 51 calculates a lens bottom point voltage γ and a lens top point voltage δ at the time of starting based on the focus search driving voltage R corresponding to the all sum signal value AS-cd at the position of the CD signal surface 12 stored in the memory section 51a and a predetermined factor by using a calculation program from the program section 51e of the control section 51. Then, the lens bottom point voltage γ and the lens top point voltage δ at the time of starting which have been obtained by a learning effect based on the focus search driving voltage R corresponding to the position of the CD signal surface 12 are stored in the memory section 51a.

Here, in the case of obtaining the lens bottom point voltage γ and the lens top point voltage δ at the time of starting by calculation, the predetermined factor is sensitivity of the focus coil 75, surface wobbling of the unillustrated turntable, a surface wobbling permissible value of the optical disc or the like.

The lens bottom point corresponding to the lens bottom point voltage γ at the time of starting obtained by the calculation is nearer to the lens midpoint side than the temporarily set lens bottom point corresponding to the temporarily set lens bottom point voltage α. The lens top point corresponding to the lens top point voltage δ at the time of starting obtained by the calculation is nearer to the lens midpoint side than the temporarily set lens top point corresponding to the temporarily set lens top point voltage β. Thus, a moving range of the objective lens 73 at the time of starting becomes smaller than the temporarily set moving range. As a result, time necessary for focus searching is shortened, and quick transfer can be made to a data reproducing operation after focus searching.

Note that, regarding setting of a working range of the objective lens 73, the operation before shipping from the factory has been described in this embodiment. However, a constitution is employed in which changes of the optical disc device 50 with time after shipping from the factory, characteristics of the optical disc to be used, etc., are learned, and a working range of the objective lens 73 can be set again automatically based on learning effects by using a program of the microcomputer.

Next, as shown in FIG. 9, after setting of the lens bottom point voltage γ and the lens top point voltage δ at the time of starting, a focus search driving voltage Q corresponding to an all sum signal value AS-dvd on a DVD signal surface 32 is obtained by using a reference DVD-SL 30 in which the DVD signal surface 32 is located at a position of about 0.6 mm from the beam incident surface 31a. The focus search driving voltage Q is stored in the memory section 51a of the control section 51. This focus search driving voltage Q is used for identifying a type of the optical disc, which will be described later.

Further, a description will be made of operations of detecting presence of an optical disc and identifying a type thereof during focus searching on the optical disc by the objective lens 73, which are main parts of the present invention, with reference to FIGS. 10 to 16.

Figure 10:
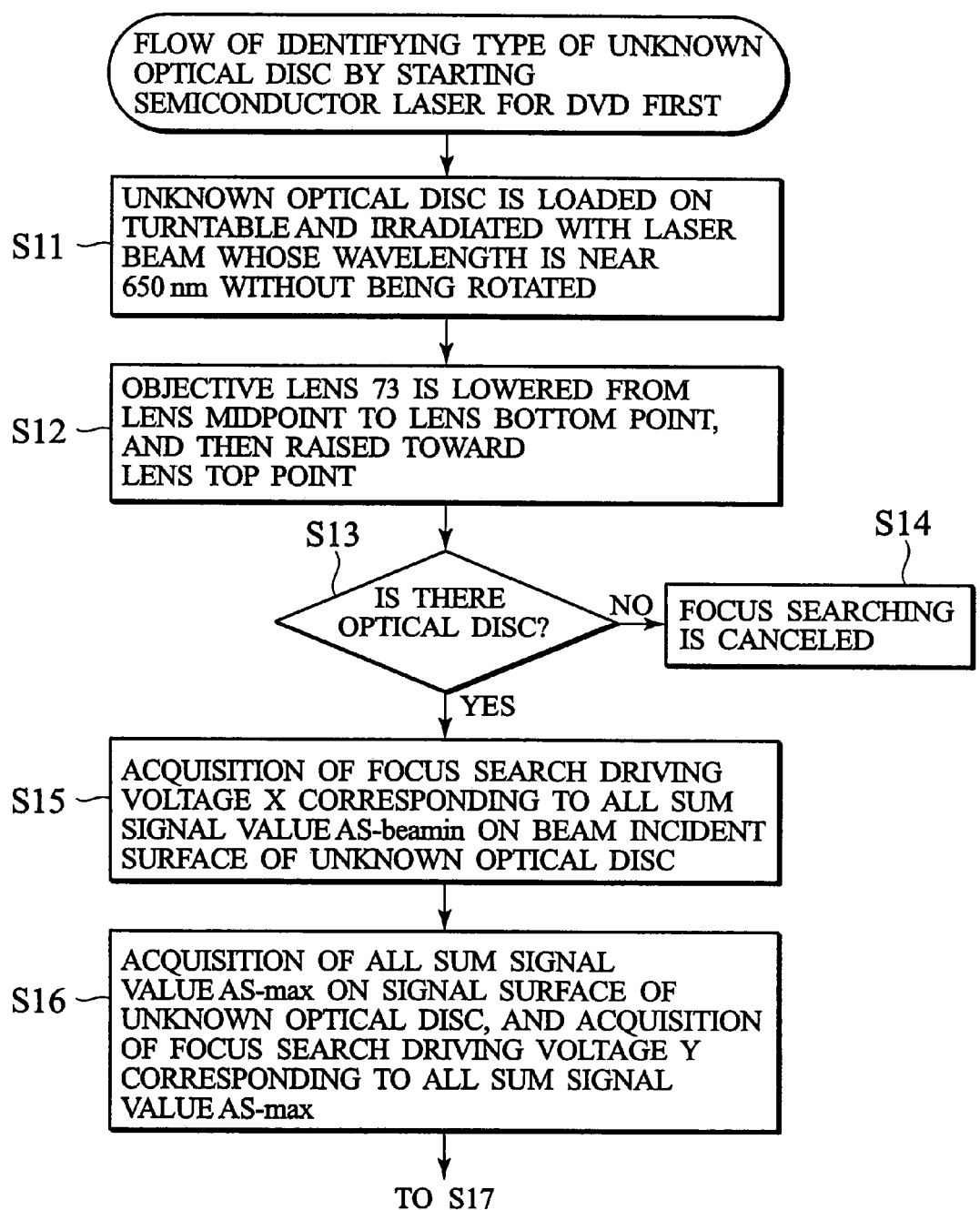
FIG. 10 is a flowchart (1) of identifying a type of an unknown optical disc by starting a semiconductor laser for DVD first.
Figure 11:
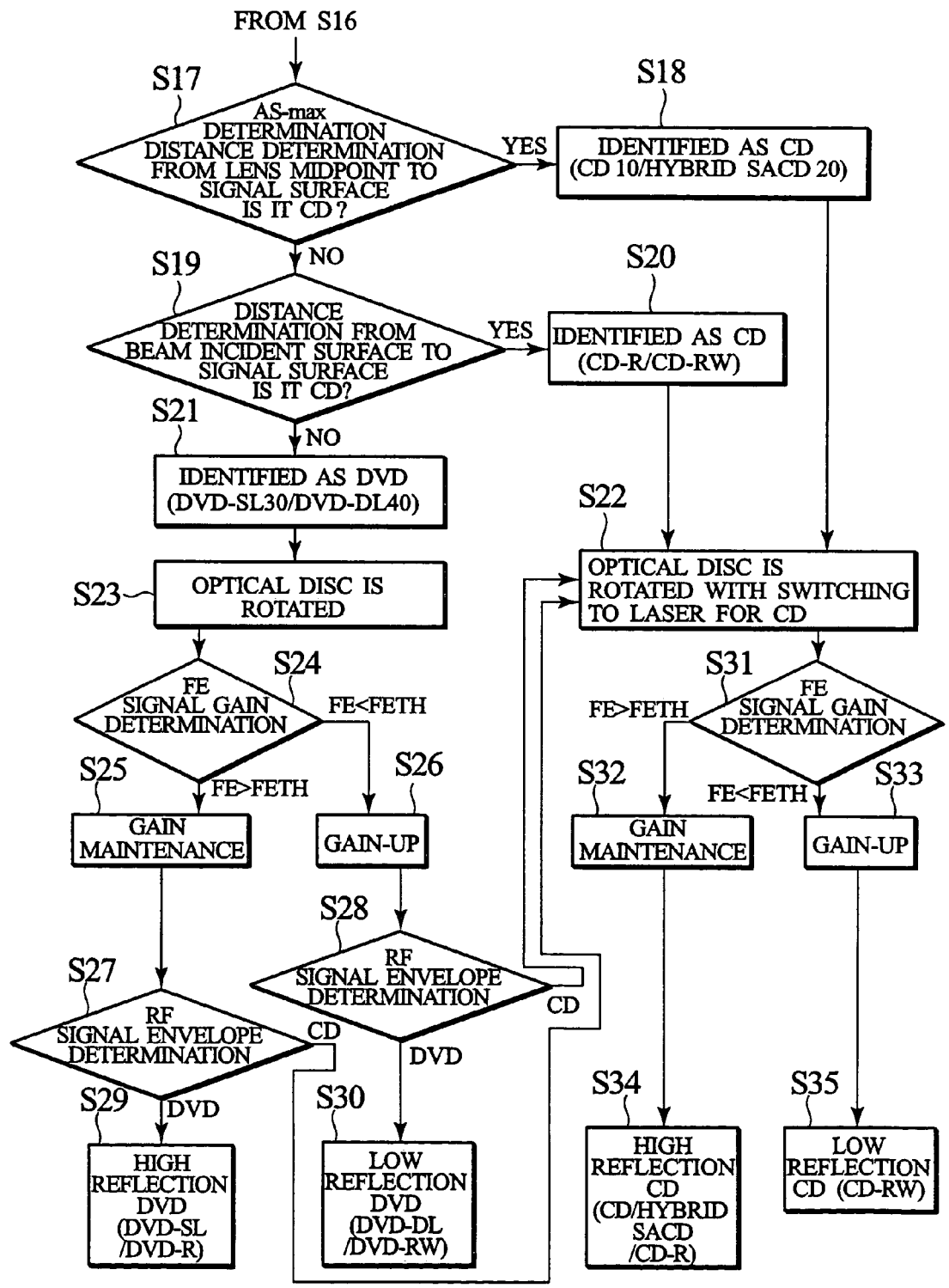
FIG. 11 is a flowchart (2) of identifying the type of the unknown optical disc by starting the semiconductor laser for DVD first.
Figure 12:
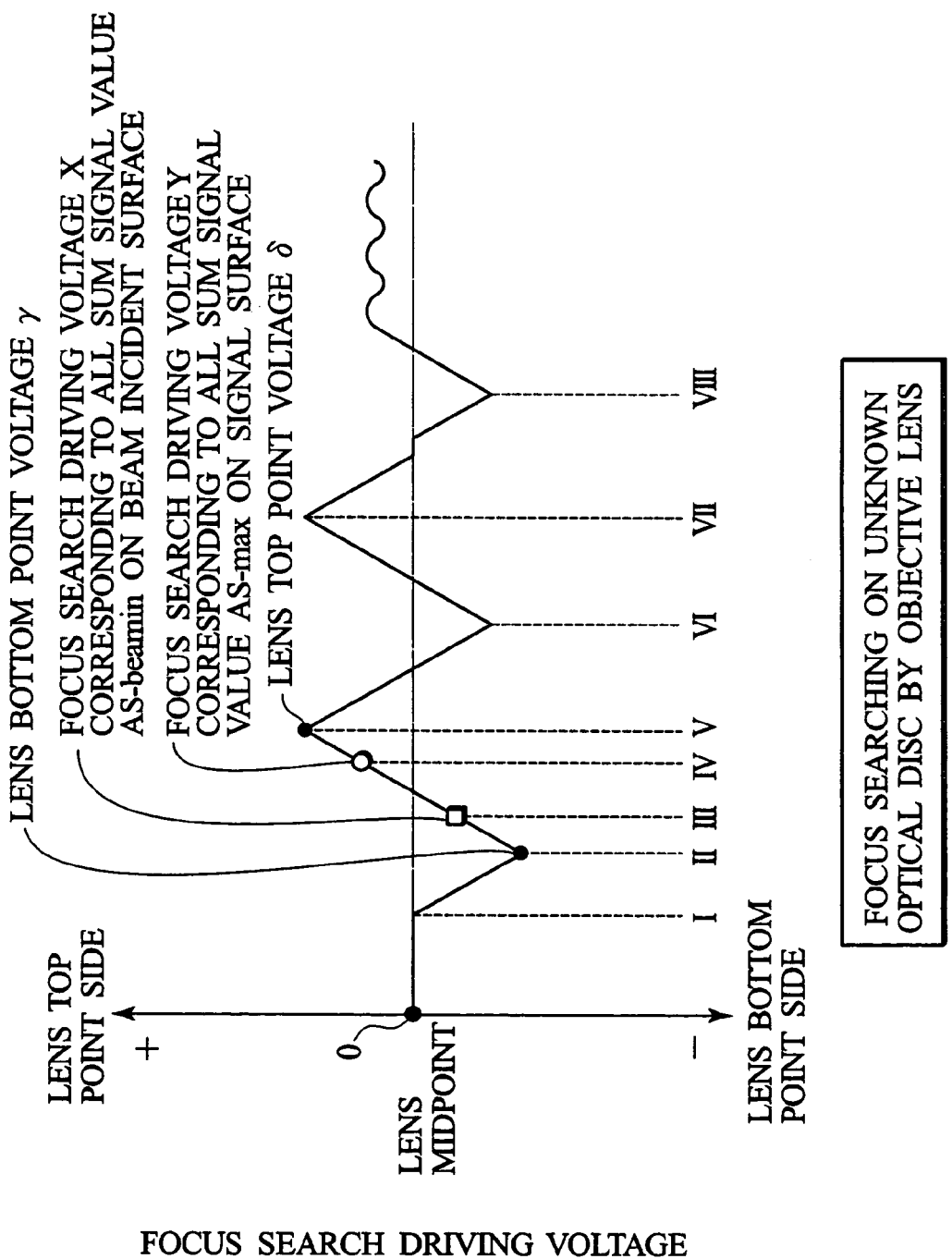
FIG. 12 is a schematic operation view explaining a focus searching operation on the unknown optical disc by the objective lens.
Figure 14A:
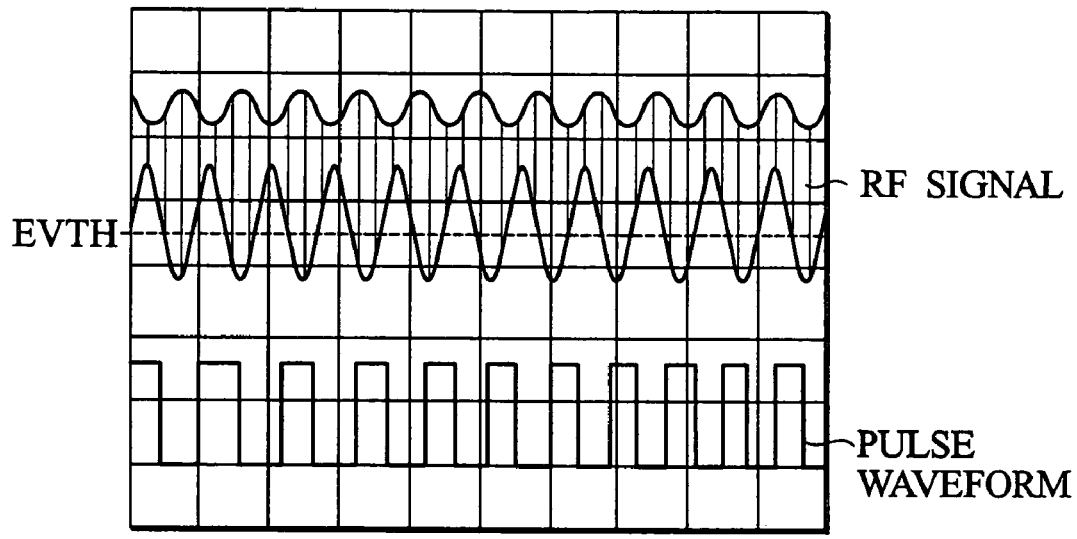
FIGS. 14A and 14B are schematic views for explaining the operation of identifying the type of the unknown optical disc based on an envelope track state of an RF signal, FIG. 14A showing a case of a CD signal surface of a hybrid SACD, and FIG. 14B showing a case of a DVD-SL, a DVD-DL.
Figure 14B:
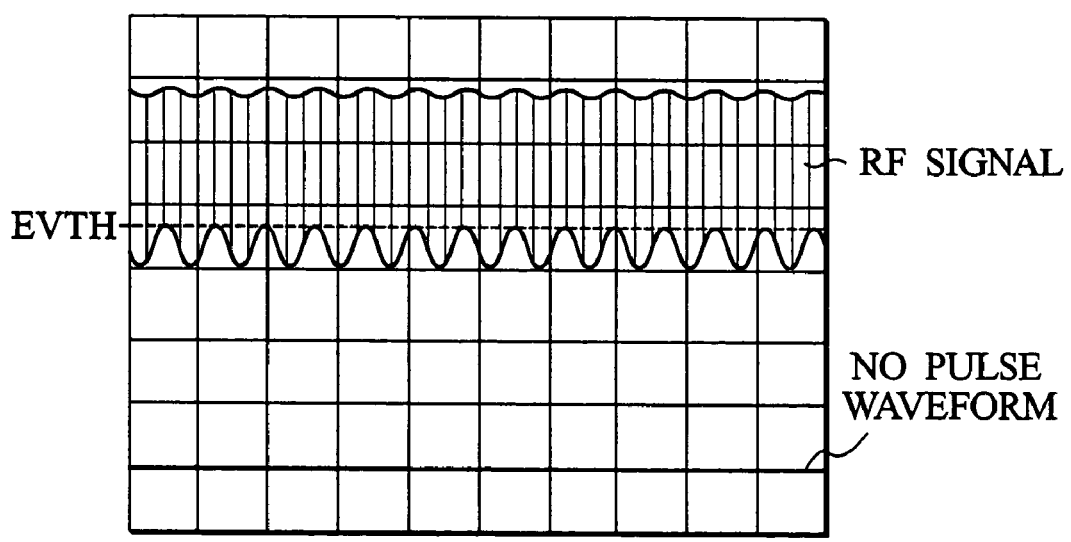

FIG. 10 is a flowchart (1) of identifying a type of an unknown optical disc by starting a semiconductor laser for DVD first. FIG. 11 is a flowchart (2) of identifying the type of the unknown optical disc by starting the semiconductor laser for DVD first. FIG. 12 is a schematic operation view explaining a focus searching operation on the unknown optical disc by the objective lens. FIG. 13 is a schematic operation view showing the operation of identifying the type of the unknown optical disc when focus searching is carried out by using the semiconductor laser for DVD. FIGS. 14A and 14B are schematic views for explaining the operation of identifying the type of the unknown optical disc based on an envelope track state of an RF signal: FIG. 14A shows a case of a CD signal surface of a hybrid SACD, and FIG. 14B shows a case of a DVD-SL, a DVD-DL.

First, when focus searching on the unknown optical disc by the objective lens 73 is performed, a threshold value TH ((b) to (g) of FIG. 13) corresponding to an all sum signal value AS-beamin obtained on the beam incident surface of the optical disc has been previously stored in the memory section 51a of the control section 51 in order to detect whether the unknown optical disc has been loaded in the optical disc device 50 (detection of presence of optical disc). The threshold value TH is preset to be smaller than the all sum signal value AS-beamin obtained on the beam incident surface of the optical disc.

An all sum signal value AS-cdref for CD signal surface reference is previously stored in the memory section 51 of the control section 51 to identify a CD signal surface 12 of the CD 10 or a CD signal surface 25 of the hybrid SACD 20 as a CD. The all sum signal value AS-cdref for the CD signal surface reference is smaller than the all sum signal value AS-cd obtained on each of the CD signal surface 12 of the CD 10 and the CD signal surface 25 of the hybrid SACD 20, and usually larger than a value of an all sum signal obtained on a signal surface of the other optical disc excluding the CD signal surface 12 of the CD 10 and the CD signal surface 25 of the hybrid SACD 20.

Moreover, in order to identify the type of the unknown optical disc, in the memory section 51a of the control section 51, a threshold value FETH (not shown) for detecting a reflectance of the signal surface of the optical disc by using a focus error signal FE and a threshold value EVTH (FIGS. 14A and 14B) for detecting an envelope track state of a data reproducing signal RF are previously stored.

Furthermore, the lens bottom point voltage γ and the lens top point voltage δ at the time of starting obtained by calculation as described above, the focus search driving voltage Q corresponding to the all sum signal value AS-dvd on the DVD signal surface 32 obtained by using the reference DVD-SL 30, and the focus search driving voltage R corresponding to the all sum signal value AS-cd on the CD signal surface 12 obtained by using the reference CD 10 are previously stored in the memory section 51a of the control section 51.

Here, in the present invention, the semiconductor laser 64 for DVD is started first in order to identify the type of the unknown optical disc as described above. Thus, the operation of identifying the type of the unknown optical disc by using the semiconductor laser 64 for DVD will be described first, and the operation of identifying the type of the unknown optical disc by using the semiconductor laser 63 for CD will be described later as a modified example of the invention.

First, as shown in FIG. 10, in step S11, an optical disc whose type is unknown is loaded on the unillustrated turntable. Without rotating the unknown optical disc, the semiconductor laser 64 for DVD is started to irradiate an innermost peripheral side of the optical disc with a laser beam from a beam incident surface side.

Next, in step S12, the laser beam from the semiconductor laser 64 for DVD is narrowed by the objective lens 73. The objective lens 73 is lowered from a lens midpoint (I of FIG. 12) to a lens bottom point (II of FIG. 12) corresponding to the lens bottom point voltage γ at the time of starting as shown in FIG. 12 and FIG. 13 while the unknown optical disc of a rotation stopped state is irradiated with a laser beam whose wavelength is near 650 nm from the objective lens 73. Then, the objective lens 73 is raised to a lens top point (V of FIG. 12) corresponding to the lens top point voltage δ at the time of starting. While raising the objective lens 73, an all sum signal AS from the photodetector signal processing circuit 53 is inputted to the arithmetic operation section 51b of the control section 51 to be monitored. Note that, an operation opposite to the above is possible. That is, the objective lens 73 placed on standby at the lens midpoint is raised to the lens top point, and then lowered from the lens top point toward the lens bottom point.

Next, in step S13, presence of an unknown optical disc is detected while raising the objective lens 73. The detection of optical disc presence is carried out by obtaining an all sum signal value AS-beamin (III of FIG. 12) obtained on the beam incident surface of the unknown optical disc while raising the objective lens 73, and making comparison at the arithmetic operation section 51b of the control section 51 to determine whether the all sum signal value AS-beamin is larger than the threshold value TH ((b) to (g) of FIG. 13) previously stored in the memory section 51a of the control section 51. Here, when the disc is determined not to be present (NO), the focus searching is canceled in step S14.

Incidentally, when the disc is determined not to be present (NO) in step S13, instead of immediately proceeding to step S14, by raising the objective lens 73 to the lens top point, and then by shifting the objective lens 73 slightly to a position from the innermost peripheral side toward the outer peripheral side, detection of optical disc presence can be carried out more surely. Further, when the disc is determined not to be present (NO) in step S13, a return light from the optical disc by the semiconductor laser 64 for DVD may have low sensitivity to the recordable CD-R, CD-RW. In this case, the semiconductor laser is switched to the semiconductor laser 63 for CD to carry out detection of optical disc presence again. Accordingly, the detection of optical disc presence can carried out more surely.

On the other hand, when presence of an optical disc is determined (YES) in step S13, a focus search driving voltage X corresponding to the all sum signal value AS-beamin obtained on the beam incident surface of the unknown optical disc is obtained by the focus search driving signal generation section 51c of the control section 51 in step S15. This focus search driving voltage X is stored in the memory section 51a of the control section 51.

Next, in step S16, the objective lens 73 is raised to obtain an all sum signal value AS-max (IV of FIG. 12) obtained on the signal surface of the unknown optical disc and a focus search driving voltage Y corresponding to the all sum signal value AS-max by the focus search driving signal generation section 51c of the control section 51. The focus search driving voltage Y is stored in the memory section 51a of the control section 51.

Next, as shown in FIG. 11, in step S17, in order to identify a type of the unknown optical disc, an all sum signal value AS-max of a return light reflected on the signal surface of the unknown optical disc is determined by the following expression (1), and a distance from a lens midpoint to the signal surface of the unknown optical disc is determined with the lens midpoint (natural position) of the objective lens 73 set as a reference by the following expression (2).

$$\text{As-max} > \text{AS-cdref} \quad (1)$$

where

AS-max: all sum signal value on the signal surface of the unknown optical disc

AS-cdref: all sum signal value for CD signal surface reference preset to identify the CD 10 and the hybrid SACD 20 as a CD based on respective CD signal surfaces 12, 25 thereof $$Y > \{(Q+2R)/3\} \quad (2)$$

where

Y: focus search driving voltage corresponding to the all sum signal value AS-max on the signal surface of the unknown optical disc Q: focus search driving voltage corresponding to the all sum signal value AS-dvd on the DVD signal surface of the reference DVD R: focus search driving voltage corresponding to the all sum signal value AS-cd on the CD signal surface of the reference CD In the expression (1), the all sum signal value AS-max is obtained in step S16, while the all sum signal value for the CD signal surface reference AS-cdref is previously stored in the memory section 51a of the control section 51 before shipping of the optical disc device 50 as described above.

In this event, when the expression (1) is satisfied, the all sum signal value AS-max on the signal surface of the unknown optical disc is larger than the preset all sum signal value for the CD signal surface reference AS-cdref. However, it is impossible to determine that the signal surface of the unknown optical disc is the signal surface 12 of the CD 10 or the signal surface 25 of the hybrid SACD only by the expression (1). A reason is that the expression (1) may be satisfied even by the other type of an optical disc such as a high-reflection DVD to be described later. Hence, determination by the expression (2) becomes necessary.

That is, in the expression (2), the focus search driving voltage Y is obtained in step S16. On the other hand, the focus search driving voltage Q has been obtained beforehand from the reference DVD-SL 30 before the shipping of the optical disc device 50, and the focus search driving voltage R has been obtained beforehand from the reference CD 10 before the shipping of the same. Then, both focus search driving voltages Q and R has been previously stored in the memory section 51a of the control section 51.

In the determination of the expression (2), the lens midpoint (natural position) of the objective lens 73 is set as the reference, and the distance from the lens midpoint to the signal surface of the unknown optical disc is converted into the focus search driving voltage. Then, when the expression (2) is satisfied, the objective lens 73 is focused on the signal surface of the unknown optical disc, and the focus search driving voltage value Y corresponding to the signal surface is larger than the focus search driving voltage $\{(Q+2R)/3\}$ corresponding to the distance from the lens midpoint of the objective lens 73 to the CD signal surface 12 of the reference CD 10. Accordingly, the signal surface of the unknown optical disc is regarded as the signal surface 12 of the CD 10 or the signal surface 25 of the hybrid SACD.

Thus, when the expressions (1) and (2) are satisfied (YES), in step S18, the unknown optical disc is identified as a CD by the optical disc type identification section 51d of the control section 51. In this case, the unknown optical disc is the CD 10 shown in (b) of FIG. 13 or the hybrid SACD 20 shown in (d) of FIG. 13. Especially, since the hybrid SACD 20 is identified simply as a CD to enable playing-back of only the CD signal surface 25 thereof, no HD signal processing section for processing the HD signal surface 22 of the hybrid SACD 20 needs to be disposed in the RF signal demodulation circuit 56 (FIG. 3). Accordingly, the optical disc device 50 can be provided inexpensively. Subsequently, when the disc is identified as a CD, the processing moves to step S22.

On the other hand, when neither of the expressions (1) and (2) are satisfied (NO), in step S19, a distance from the beam incident surface of the unknown optical disc to the signal surface is determined by the following expression (3) in order to identify a type of the unknown optical disc.

$$(Y-X) > \{5 \times (R-Q)/3\} \quad (3)$$

where

Y: focus search driving voltage corresponding to the all sum signal value AS-max on the signal surface of the unknown optical disc X: focus search driving voltage corresponding to the all sum signal value AS-beamin on the beam incident surface of the unknown optical disc R: focus search driving voltage corresponding to the all sum signal value AS-cd on the CD signal surface of the reference CD Q: focus search driving voltage corresponding to the all sum signal value AS-dvd on the DVD signal surface of the reference DVD In the expression (3), the focus search driving voltage Y is obtained in step S16, and the focus search driving voltage X is obtained in step S15. Moreover, the focus search driving voltages R and Q are similar to those of the expression (2).

In this case, when the expression (3) is satisfied (YES), while a result of determination in step S17 shows that the all sum signal value AS-max on the signal surface of the unknown optical disc is smaller than the all sum signal value for the CD signal surface reference AS-cdref, the focus search driving voltage value (Y−X) corresponding to the distance from the beam incident surface of the unknown optical disc to the signal surface is larger than the focus search driving voltage value $\{5 \times (R-Q)/3\}$ corresponding to the distance from the beam incident surface 11a of the reference CD 10 to the CD signal surface 12. Thus, a position of the signal surface of the unknown optical disc is considered to be equal to that of the signal surface 12 of the CD 10. As a result, the unknown optical disc is identified as a CD by the optical disc type identification section 51d of the control section in step S20. In this case, the unknown optical disc is the CD-R or CD-RW shown in (c) of FIG. 13, and then the processing moves to step S22.

On the other hand, when the expression (3) is not satisfied (NO), in step S21, the unknown optical disc is identified as a DVD by the optical disc type identification section 51d of the control section 51. In this case, the unknown optical disc is the DVD-SL 30 shown in (e) and (f) of FIG. 13 or the DVD-DL 40 shown in (g) of FIG. 13.

Then, when the unknown optical disc is identified as a CD in step S18 or step S20, the optical disc is subsequently rotated at a high speed by the unillustrated spindle motor in step S22, and the semiconductor laser 64 for DVD is switched to the semiconductor laser 63 for CD.

Meanwhile, when the unknown optical disc is identified as a DVD in step S21, the optical disc is rotated at a high speed by the unillustrated spindle motor in step S23, and the operation of the semiconductor laser 64 for DVD is continued. In this event, after the all sum signal value AS-max (IV of FIG. 12) on the signal surface of the unknown optical disc is obtained, the optical disc is rotated at a high speed while raising the objective lens 73 toward the lens top point (V of FIG. 12).

The aforementioned steps S15 to S23 are characterized in that the unknown optical disc is identified as a CD or a DVD by using the all sum signal value AS-max obtained on the signal surface of the unknown optical disc, the all sum signal value for the CD signal surface reference AS-cdref preset to identify the CD 10 and the hybrid SACD 20 as a CD based on respective CD signal surfaces 12, 25 thereof, the focus search driving voltage X obtained by corresponding to the beam incident surface of the unknown optical disc, the focus search driving voltage Y obtained by corresponding to the signal surface of the unknown optical disc, the focus search driving voltage Q previously stored corresponding to the DVD signal surface 32 of the reference DVD-SL 30, and the focus search driving voltage R previously stored corresponding to the CD signal surface 12 of the reference CD 10. In order to further improve accuracy of the type identification of the unknown optical disc, steps S24 to S35 described below are used to identify a high reflection DVD or a low reflection DVD, a high reflection CD or a low reflection CD.

That is, when the unknown optical disc is identified as a DVD in step S21, in step S24, a peak to peak (p-p) value of a focus error signal FE obtained in the photodetector signal processing circuit 53 is fetched into the arithmetic operation section 51b of the control section 51. The p-p value of the focus error signal FE is compared with a threshold value FETH (not shown) previously stored in the memory section 51a of the control section 51 to determine a gain based on the focus error signal FE. In this event, the gain determination based on the focus error signal FE is carried out between VI and VII of FIG. 12.

When the p-p value of the focus error signal FE is larger than the threshold value FETH, a gain is maintained for the signal system of the photodetector signal processing circuit 53 in step S25 to proceed to step S27. Subsequently, pulling-in of the objective lens 73 is started at timing of VIII of FIG. 12. On the other hand, when the p-p value of the focus error signal FE is smaller than the threshold value FETH, a gain-up command signal GUP (FIG. 3) is sent from the control section 51 to the photodetector signal processing circuit 53 to increase the gain (gain-up) for the signal system in step S26, and the processing moves to step S28. Subsequently, the pulling-in of the objective lens 73 is started at timing of VIII of FIG. 12.

Next, in steps S27 and S28, envelope determination is carried out for a data reproducing signal RF obtained in the photodetector signal processing circuit 53 mainly to identify a high reflection DVD or a low reflection DVD, and to detect a CD mistakenly determined to be a DVD for one reason or another while the unknown optical disc is a CD.

Here, in the envelope determination of the data reproducing signal RF, when the CD signal surface 12 of the CD 10 or the CD signal surface 25 of the hybrid SACD is played back as shown in FIG. 14A, a track pitch of each of the signal surfaces 12, 25 is wide, i.e., 1.6 μm. Accordingly, a peak and bottom waveform conspicuously appears for each crossing of a track in the envelope of the RF signal, and a pulse waveform can be generated for the peak and bottom waveform by using the threshold value EVTH previously stored in the memory section 51a of the control section 51. As a result, the unknown optical disc can be identified as a CD.

On the other hand, when the DVD signal surface 32 of the DVD-SL 30 or the first and second DVD signal surfaces 42, 45 of the DVD-DL 40 are played back as shown in FIG. 14B, a track pitch of each of the signal surfaces 32, 42 and 45 is narrower and denser, i.e., 0.8 μm, compared with the CD. Accordingly, no peak and bottom waveform appears at crossing of a track in the envelope of the RF signal. Thus, since no pulse waveform is generated even when the threshold value EVTH is used, the unknown optical disc can be identified as a DVD.

Therefore, if gain maintenance is determined for the signal system in step S25, and RF signal envelop determination is carried out in step S27, the processing moves to step S22 when a disc is identified as a CD. When a disc is identified as a DVD, in step S29, the disc can be identified as a read-only DVD-SL 30 or DVD-R (not shown) in which a signal layer is one layer and a reflectance is high as shown in (e) of FIG. 13.

On the other hand, when gain-up is determined for the signal system in step S26, and RF signal envelope determination is carried out in step S28, the processing moves to step S22 when a disc is identified as a CD. When the disc is identified as a DVD, in step S30, the disc can be identified as a recordable DVD-SL 30 (DVD-RW) in which a signal layer is one layer and a reflectance is low as shown in (f) of FIG. 13, or a DVD-DL 40 in which a signal layer is constituted of two layers and a reflectance is low as shown in (g) of FIG. 13.

Additionally, when the disc is identified as the CD 10 or the hybrid SACD 20 among CDs in step S18, or when the disc is identified as CD-R or the CD-RW among CDs in step S20, the optical disc is rotated at a high speed in step S22; the semiconductor laser 64 for DVD is switched to the semiconductor laser 63 for CD, and then gain determination is carried out for the optical disc based on a focus error signal FE similarly to the above-described case in step S31; gain maintenance is determined for the signal system in step S32 when a p-p value of the focus error signal FE is larger than the threshold value FETH; and gain-up is determined for the signal system in step S33 when the p-p value of the focus error signal FE is smaller than the threshold value FETH. Thus, when the gain maintenance is determined in step S32, the disc can be identified as a high reflection CD in step S34. The high reflection CD includes the CD 10, the hybrid SACD 20, and the CD-R. On the other hand, when the gain-up is determined in step S33, the disc can be identified as a low reflectance CD in step S35. The low reflectance CD includes the CD-RW.

Next, brief description will be given of an operation of identifying a type of an unknown optical disc by using the semiconductor laser 63 for CD, as modified example of the present invention with reference to FIGS. 15 to 17.

Figure 15:
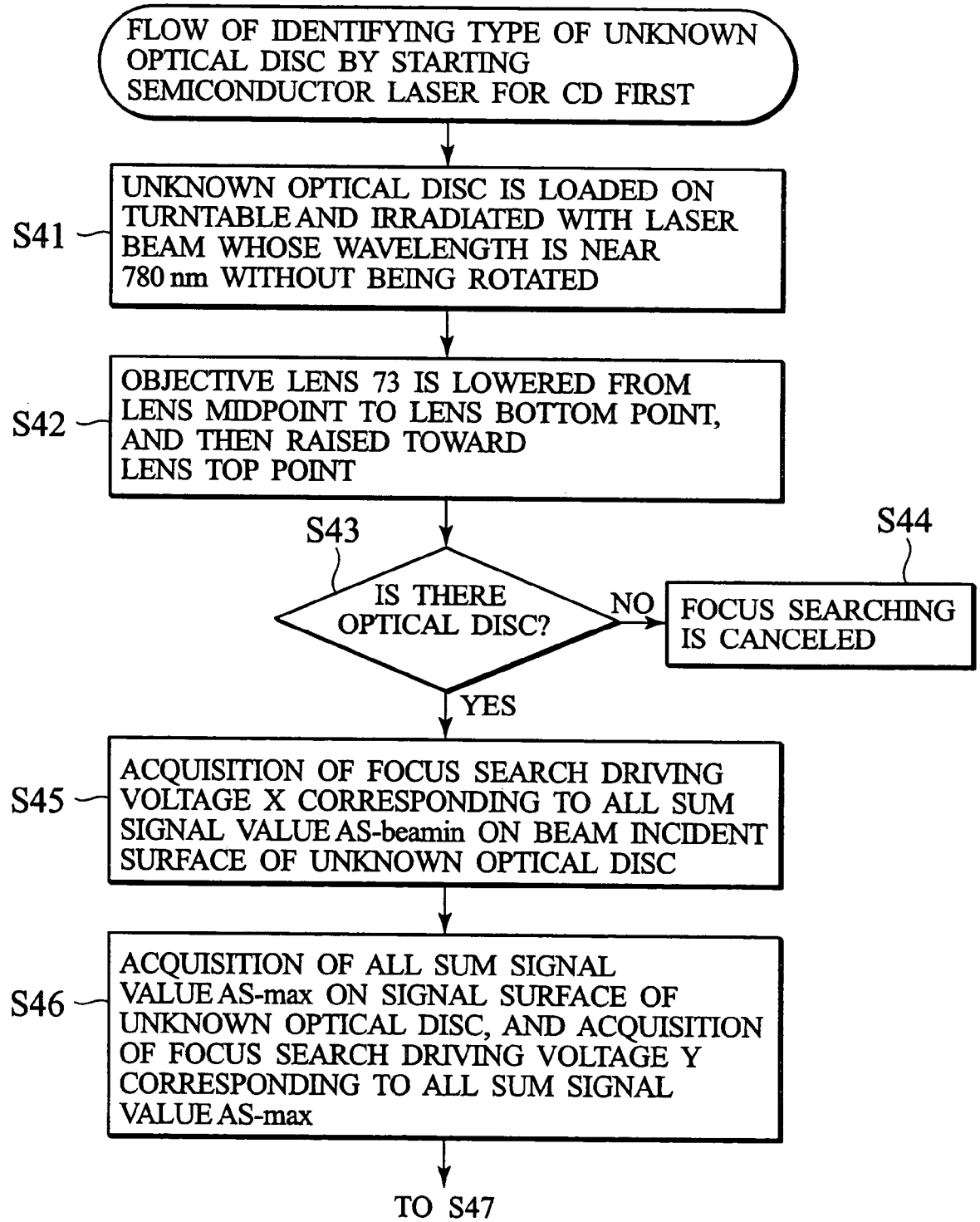
FIG. 15 is a flowchart (1) of identifying the type of the unknown optical disc by starting a semiconductor laser for CD first.

FIG. 15 is a flowchart (1) of identifying a type of an unknown optical disc by staring the semiconductor laser for CD first. FIG. 16 is a flowchart (2) of identifying the type of the unknown optical disc by starting the semiconductor laser for CD first. FIG. 17 is a flowchart (3) of identifying the type of the unknown optical disc by starting the semiconductor laser for CD first.

In the case of identifying the type of the unknown optical disc by starting the semiconductor laser 63 for CD first, a technical idea thereof is similar to that of identifying the type of the unknown optical disc by staring the semiconductor laser 64 for DVD first. However, since especially a recordable optical disc that uses dyes has wavelength dependence in response to a laser beam, if the semiconductor laser 63 for CD is activated, a result of identification is different from that of the semiconductor laser 64 for DVD. Description of the modified example will focus on differences from the case of starting the semiconductor laser 64 for DVD first.

To begin with, as shown in FIG. 15, only step S41 among operations of steps S41 to S46 is different from the steps S11 to S16 shown in FIG. 10, in which the semiconductor laser 64 for DVD is started first, in that the semiconductor laser 63 for CD emitting a laser beam having a wavelength of near 780 nm is started first. In the middle of raising the objective lens 73 from the lens bottom point toward the lens top point in step S42, detection of optical disc presence (step S43), acquisition of a focus search driving voltage X corresponding to an all sum signal value AS-beamin obtained on the beam incident surface of the unknown optical disc (step S45), and acquisition of an all sum signal value AS-max obtained on the signal surface of the unknown optical disc and a focus search driving voltage Y corresponding to the all sum signal value AS-max (step S46) are sequentially carried out.

Figure 16:
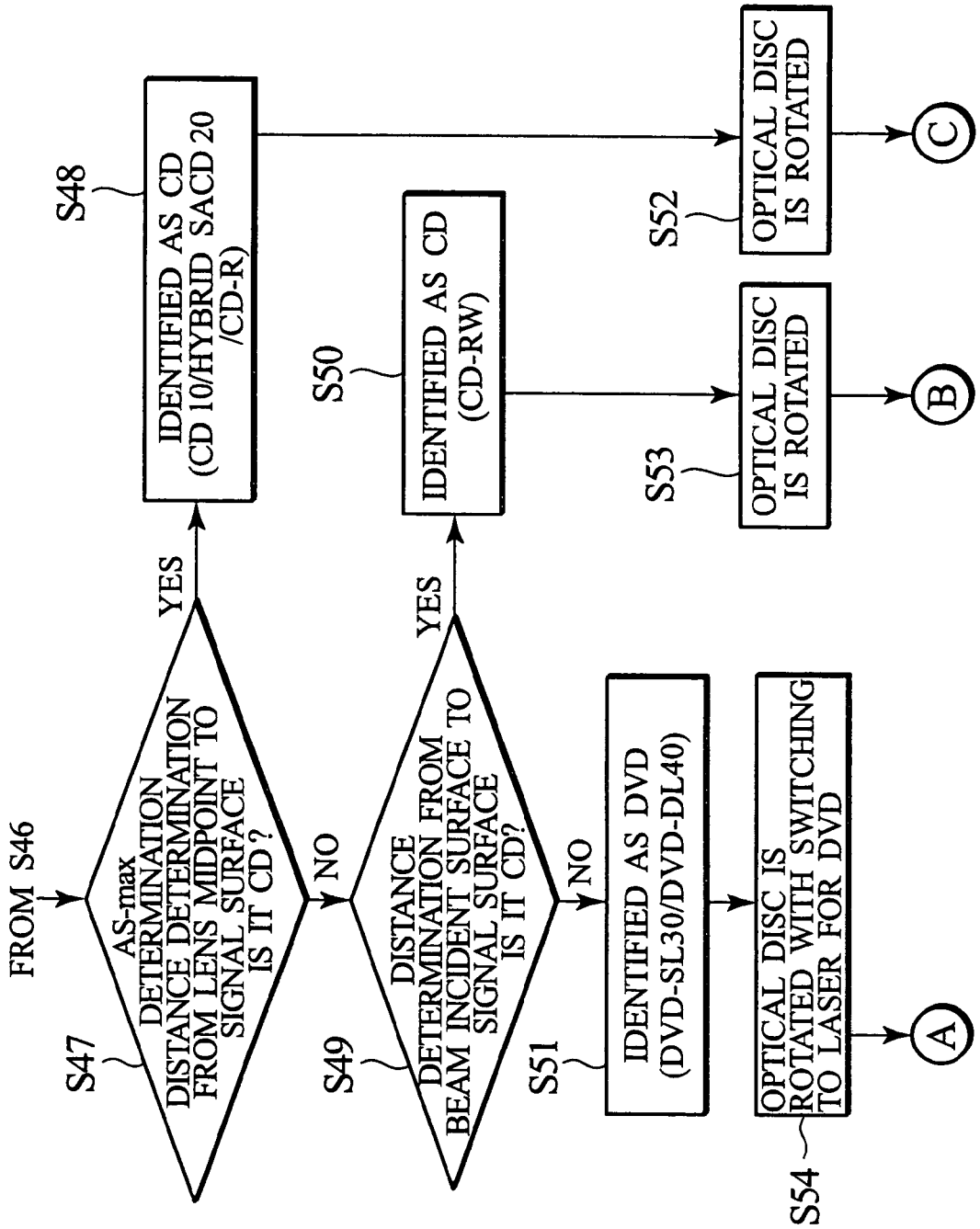
FIG. 16 is a flowchart (2) of identifying the type of the unknown optical disc by starting a semiconductor laser for CD first.

Subsequently, as shown in FIG. 16, in step S47, in accordance with the wavelength dependence of the semiconductor laser 63 for CD on the optical disc, an all sum signal value AS-cdref for CD signal surface reference itself for identifying the CD 10, the hybrid SACD, and CD-R as a CD based on the CD signal surface 12 of the CD 10, the CD signal surface 25 of the hybrid SACD 20 or the CD signal surface (not shown) of the CD-R is preset by making a slight change from the case of the semiconductor laser 64 for DVD. Thus, when all sum signal value-AS-max-determination of a return light reflected on the signal surface of the unknown optical disc is carried out by the expression (1), and distance determination from the lens midpoint to the signal surface of the unknown optical disc with the lens midpoint (natural position) of the objective lens 73 set as a reference is carried out by the expression (2), if the expressions (1) and (2) are both satisfied (YES), the unknown optical disc is identified as a CD by the optical disc type identification section 51d of the control section 51 in step S48. In this case, however, a difference from the case of starting the semiconductor laser 64 for DVD first is that the unknown optical disc is the CD 10 shown in (b) of FIG. 13 or the hybrid SACD 20 shown in (d) of FIG. 13, and a CD-R is included.

Next, assuming that neither of the expressions (1) and (2) are satisfied (NO), if the expression (3) is satisfied (YES) when distance determination from the beam incident surface of the unknown optical disc to the signal surface is carried out by the expression (3) in step S49, the unknown optical disc is identified as a CD by the optical disc type identification section 51d of the control section 51 in step S50. In this case, however, a difference from the case of starting the semiconductor laser 64 for DVD first is that the unknown optical disc is only a CD-RW.

On the other hand, if the expression (3) is not satisfied (NO), the unknown optical disc is identified as a DVD by the optical disc type identification section 51d of the control section 51 in step S51. In this case, the unknown optical disc is the DVD-SL 30 shown in (e) and (f) of FIG. 13, or the DVD-DL 40 shown in (g) of FIG. 13, which is similar to the case of starting the semiconductor laser 64 for DVD first.

Subsequently, the optical disc identified to be the DVD in step S51 is rotated at a high speed in step S54, and the semiconductor laser 63 for CD is switched to the semiconductor laser 64 for DVD to carry out gain determination for the optical disc identified to be the DVD based on a focus error signal FE (step S55) as shown in FIG. 17. After the operation is divided into gain maintenance for the signal system (step S56) and gain-up for the signal system (step S57), envelope determination is carried out for data reproducing signals RF (steps S58, S59). Accordingly, as in the case of staring the semiconductor laser 64 for DVD first, a high reflection DVD (DVD-SL/DVD-R) is identified in step S60, while a low reflection DVD (DVD-DL/DVD-RW) is identified in step S61 as shown in FIG. 17.

Further, a CD mistakenly determined to be a DVD for one reason or another while the unknown optical disc is a CD is detected in the envelope determination of the data reproducing signals RF (steps S58, S59). Here, if it is detected to be a CD, the semiconductor laser 64 for DVD is switched to the semiconductor laser 63 for CD in step S62. Gain determination is carried out again based on the focus error signal FE in step S63. The processing moves to step S64 (described later) if a result of the gain determination shows gain maintenance for the signal system. On the other hand, the processing moves to step S66 (described later) if gain-up is determined for the signal system.

Additionally, if the CD 10, the hybrid SACD 20 or the CD-R is identified among CDs in step S48, the optical disc is rotated at a high speed in step S52. If the CD-RW is identified among CDs in step S50, the optical disc is rotated at a high speed in step S53.

Subsequently, gain maintenance for the signal system is carried out for the optical disc identified to be the CD 10, the hybrid SACD 20 or the CD-R among CDs in step S64. If a high reflection CD is identified in step S65, this high reflection CD includes the CD 10, the hybrid SACD 20 and the CD-R.

On the other hand, gain-up for the signal system is carried out for the optical disc identified to be the CD-RW in step S66. If a low reflection CD is identified in step S67, this low reflection CD includes only the CD-RW.

As apparent from the foregoing, irrespective of the semiconductor laser 64 for DVD or the semiconductor laser 63 for CD, after the high reflection DVD or the low reflection DVD, the high reflection CD or the low reflection CD are identified, it is possible to quickly carry out switching of the semiconductor laser and processing of the signal system at a high speed in accordance with the result of identification.

According to the type identification method of the optical disc and the optical disc device of the present invention which have been described in detail, in the constitution in which the CD (Compact Disc), the hybrid SACD (Super Audio CD) and the DVD (Digital Versatile Disc) among optical discs can be selectively loaded, the unknown optical disc is identified as a CD especially when the all sum signal value AS-max on the signal surface of the unknown optical disc by the photodetector is larger than the all sum signal value for the CD signal surface reference AS-cdref for identifying the CD and the hybrid SACD as a CD based on the respective CD signal surfaces thereof, and the focus search driving voltage Y corresponding to the signal surface of the unknown optical disc is larger than the voltage value obtained by the predetermined relational expression between the focus search driving voltage Q corresponding to the DVD signal surface of the reference DVD and the focus search driving voltage R corresponding to the CD signal surface of the reference CD. Thus, the hybrid SACD that has an HD signal surface and a CD signal surface can be identified as simply a CD. As a result, since only two types, i.e., the CD signal processing section and the DVD signal processing section, need to be prepared in the RF signal demodulation circuit, it is possible to provide the optical disc device inexpensively.

It should be understood that many modifications and adaptations of the invention will become apparent to those skilled in the art and it is intended to encompass such obvious modifications and changes in the scope of the claims appended hereto.

What is claimed is:

1. A method of identifying a type of an optical disc loaded in an optical disc device that enables selective loading of a CD (Compact Disc), a hybrid SACD (Super Audio CD) and a DVD (Digital Versatile Disc) among optical discs, wherein the type of the optical disc is identified by irradiating an optical disc of an unknown type with a laser beam through an objective lens from a beam incident surface side, receiving a return light from a signal surface of the unknown optical disc in a plurality of photodetection areas of a photodetector in the middle of raising or lowering the objective lens placed on standby at a lens midpoint between a lower lens bottom point and an upper lens top point based on a focus search driving signal during focus searching, and adding all photodetection amounts of the plurality of photodetection areas, the method comprising the steps of:

presetting and storing an all sum signal value AS-cdref for CD signal surface reference for identifying the CD and the hybrid SACD as a CD based on respective CD signal surfaces thereof;

acquiring a focus search driving voltage Q corresponding to a DVD signal surface to previously store the same when a reference DVD is used and a return light from the DVD signal surface thereof located at a position of about 0.6 mm from the beam incident surface thereof is received by the photodetector;

acquiring a focus search driving voltage R corresponding to a CD signal surface to previously store the same when a reference CD is used and a return light from the CD signal surface thereof located at a position of about 1.2 mm from the beam incident surface thereof is received by the photodetector;

acquiring an all sum signal value AS-max by the photodetector on the signal surface of the unknown optical disc, and comparing the all sum signal value AS-max with the all sum signal value AS-cdref for the CD signal surface reference;

acquiring a focus search driving voltage Y corresponding to the signal surface of the unknown optical disc when the return light from the signal surface thereof is received by the photodetector, and comparing the focus search driving voltage Y with a voltage value acquired by a predetermined relational expression $(Q+2R)/3$ between the focus search driving voltage Q and the focus search driving voltage R; and identifying the unknown optical disc as a CD when the all sum signal value AS-max is larger than the all sum signal value AS-cdref for the CD signal surface reference, and the focus search driving voltage Y is larger than the voltage value acquired by the predetermined relational expression $(Q+2R)/3$.

2. An optical disc device in which a CD (Compact Disc), a hybrid SACD (Super Audio CD) and a DVD (Digital Versatile Disc) among optical discs are selectively loaded, and a type of an optical disc is identified by irradiating an optical disc of an unknown type with a laser beam through an objective lens from a beam incident surface side, receiving a return light from a signal surface of the unknown optical disc in a plurality of photodetection areas of a photodetector in the middle of raising or lowering the objective lens placed on standby at a lens midpoint between a lower lens bottom point and an upper lens top point based on a focus search driving signal during focus searching, and adding all photodetection amounts of the plurality of photodetection areas, the device comprising: focus search driving signal generation means for receiving respective return lights from a DVD signal surface located at a position of about 0.6 mm from the beam incident surface by using a reference DVD, from a CD signal surface located at a position of about 1.2 mm from the beam incident surface by using a reference CD, and from the signal surface of the unknown optical disc by the photodetector, and acquiring focus search driving voltages Q, R and Y corresponding to the respective signal surfaces;

photodetector signal processing means for acquiring an all sum signal value AS-max by the photodetector on the signal surface of the unknown optical disc;

storing means for prestoring an all sum signal value AS-cdref for CD signal surface reference preset for identifying the CD and the hybrid SACD as a CD based on respective CD signal surfaces thereof, the focus search driving voltage Q corresponding to the DVD signal surface of the reference DVD, and the focus search driving voltage R corresponding to the CD signal surface of the reference CD;

arithmetic operation means for comparing the all sum signal value AS-max with the all sum signal value AS-cdref for the CD signal surface reference, and comparing the focus search driving voltage Y corresponding to the signal surface of the unknown optical disc with a voltage value acquired by a predetermined relational expression $(Q+2R)/3$ between the focus search driving voltage Q and the focus search driving voltage R; and optical disc type identification means for identifying the unknown optical disc as a CD when the all sum signal value AS-max is larger than the all sum signal value AS-cdref for the CD signal surface reference, and the focus search driving voltage Y is larger than the voltage value acquired by the predetermined relational expression $(Q+2R)/3$.

* * * * *